United States Patent
Roeder (12)

(10) Patent No.: US 11,618,570 B2
(45) Date of Patent: Apr. 4, 2023

(54) INTEGRAL COMBINED MONUMENTS IN AIRCRAFT CABIN INTERIORS

(71) Applicant: The Boeing Company, Chicago, IL (US)

(72) Inventor: Raymond Roeder, Everett, WA (US)

(73) Assignee: THE BOEING COMPANY, Arlington, VA (US)

( * ) Notice: Subject to any disclaimer, the term of this patent is extended or adjusted under 35 U.S.C. 154(b) by 0 days.

(21) Appl. No.: 17/460,463

(22) Filed: Aug. 30, 2021

(65) Prior Publication Data
US 2022/0177137 A1 Jun. 9, 2022

Related U.S. Application Data

(60) Provisional application No. 63/122,055, filed on Dec. 7, 2020.

(51) Int. Cl.
| | | |
|---|---|---|
| *B64D 11/02* | (2006.01) | |
| *B64D 11/04* | (2006.01) | |
| *B64D 11/00* | (2006.01) | |

(52) U.S. Cl.
CPC .............. *B64D 11/02* (2013.01); *B64D 11/04* (2013.01); *B64D 2011/0046* (2013.01)

(58) Field of Classification Search
CPC .. B64D 11/02; B64D 11/04; B64D 2011/0046
See application file for complete search history.

(56) References Cited

U.S. PATENT DOCUMENTS

| | | | | |
|---|---|---|---|---|
| 5,083,727 A | * | 1/1992 | Pompei .................. | B64D 11/04 244/118.6 |
| 9,045,231 B2 | * | 6/2015 | Swain .................... | E06B 9/0638 |
| 2013/0206907 A1 | * | 8/2013 | Burrows ................ | B64D 11/02 244/118.5 |
| 2014/0353425 A1 | | 12/2014 | Boren, Jr. et al. | |
| 2015/0096118 A1 | * | 4/2015 | McIntosh ............... | B64D 11/02 4/300 |
| 2015/0259069 A1 | * | 9/2015 | Koyama ................ | B64D 11/02 244/118.5 |
| 2019/0127068 A1 | * | 5/2019 | Scoley ................... | B64D 11/02 |

FOREIGN PATENT DOCUMENTS

| | | |
|---|---|---|
| EP | 3110693 B1 | 8/2018 |
| EP | 3056428 B1 | 4/2019 |
| WO | 2014201397 A1 | 12/2014 |

* cited by examiner

*Primary Examiner* — Nicholas McFall
(74) *Attorney, Agent, or Firm* — Coats & Bennett, PLLC

(57) ABSTRACT

Space saving integral combined monument structures for aircraft cabin interiors comprise a common interior wall section in a multi-compartment monument and are constructed to significantly conserve space in aircraft cabin interiors by locating the integral combined monument proximate to aircraft egress areas.

20 Claims, 16 Drawing Sheets

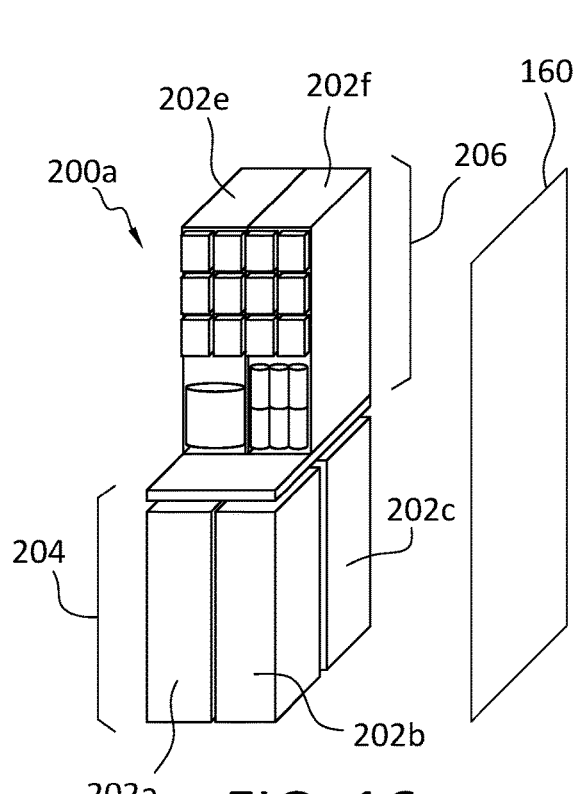 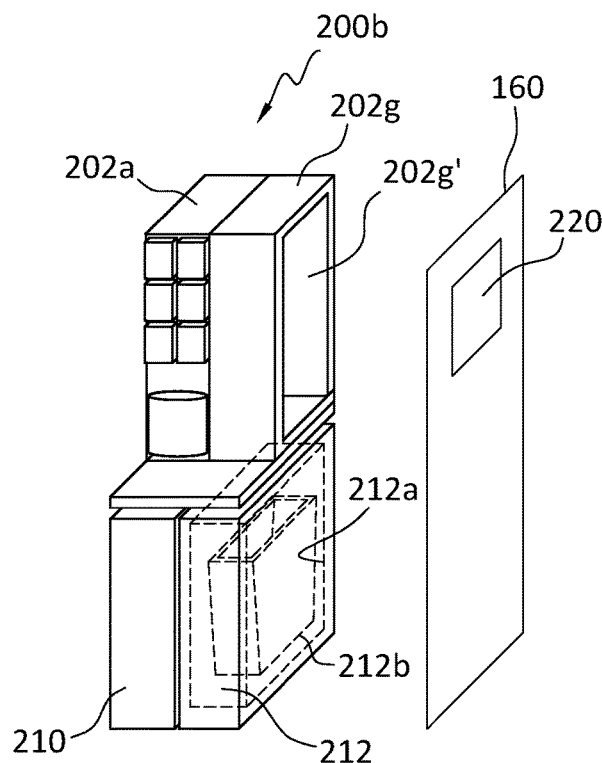
FIG. 16    FIG. 17
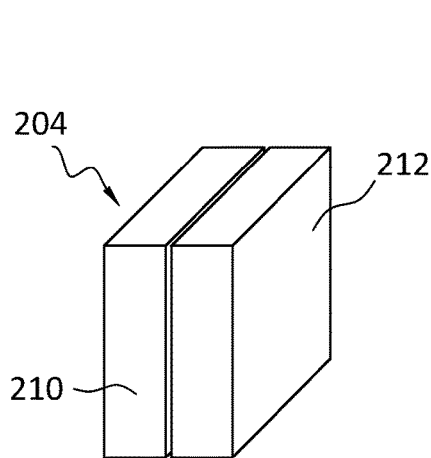 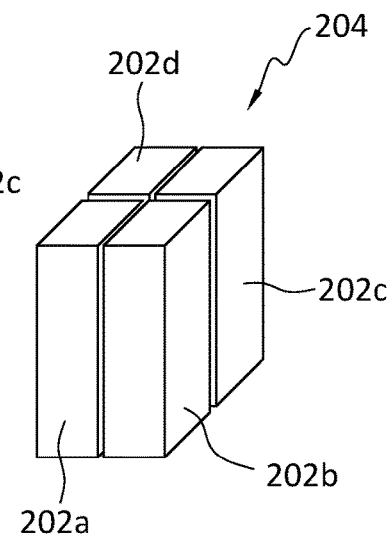
FIG. 18    FIG. 19    FIG. 20

INTEGRAL COMBINED MONUMENTS IN AIRCRAFT CABIN INTERIORS

RELATED APPLICATION

This application claims priority to U.S. Provisional Patent Application Ser. No. 63/122,055 filed on Dec. 7, 2020, the entire contents of which are incorporated herein by reference.

TECHNOLOGICAL FIELD

The present disclosure relates generally to the field of aircraft cabin interior fixtures and monuments. More specifically the present disclosure relates to the logistical orientation, construction, and implementation of monuments in an aircraft cabin environment.

BACKGROUND

Aircraft, including commercial aircraft, are confronted with the counter-balanced needs for passenger comfort, safety, etc., along with a need for passengers and attendants to access various locations within the aircraft cabin interior with ease, all the while observing and otherwise satisfying federal aviation requirements as to regions within the cabin interior including, but not limited to, ingress into and egress areas from the aircraft both under normal conditions and in cases of emergency.

These various counter-balanced needs significantly influence, and at times constrain the location and dimension of physical monuments within an aircraft cabin, as well as influence the construction, installation, usage, and usefulness of aircraft cabin interior monuments. Unless explicitly identified as such, no statement herein is admitted as prior art merely by its inclusion in the Background Section.

SUMMARY

A present aspect discloses an aircraft including an aircraft cabin interior, with the aircraft interior including an integral combined monument, and with the integral combined monument including at least one compartment, and a plurality of monument wall sections, with the plurality of monument wall sections configured to be joined together to form said integral combined monument, said plurality of monument wall sections further configured to further form the at least one compartment, said at least one compartment comprising at least one integral combined monument common interior wall section. At least a portion of the integral combined monument is oriented immediately adjacent to an egress area, and at least a portion of the integral combined monument is oriented immediately adjacent to an attendant area.

In another aspect, the plurality of monument wall sections includes at least one first monument wall section having a first length (d1), at least one second monument wall section having a second length (d2), with the second length different from the first length, and at least one third monument wall section having a third length (d3), with the third length different from the first length and second length.

In another aspect, the common interior wall section is configured to divide the integral combined monument into a first compartment and a second compartment, with the common interior wall section configured to be common to the first compartment and the second compartment.

In another aspect, the plurality of monument wall sections are configured to be assembled into a six-sided integral combined monument.

In a further aspect, the integral combined monument comprises six exterior sides.

In another aspect, the at least two adjacent sides of the integral combined monument abut or adjoin the egress area.

In another aspect, the egress area overlaps and otherwise comprises an attendant area.

In another aspect, the common interior wall section is configured to divide the integral combined monument into a first compartment and a second compartment.

In a further aspect, the integral combined monument comprises an integral combined monument footprint.

In another aspect, at least one of the first compartment and the second compartment comprises a lavatory.

In another aspect, at least one of the first compartment and the second compartment comprises a galley component.

In another aspect, at least one of the first compartment and the second compartment comprises a closet component.

In another aspect, at least one of the first compartment and the second compartment comprises at least one of: a lavatory and a galley component wherein the galley component comprises a receptacle, with the receptacle configured to be accessible from at least one of the first compartment and the second compartment, and wherein the common interior wall section further comprises a common interior wall section through opening, with the common interior wall section through opening configured to be adjacent to the receptacle, and with the receptacle configured to be accessible from the second compartment via the common interior wall section through opening.

In another aspect, at least one common interior wall section is configured to engage at least one monument post, with the at least one monument post configured to engage a support structure, said support structure comprising at least one of: an aircraft cabin ceiling component, an aircraft cabin floor component, and an outboard wall component.

In a further aspect, the common interior wall section is configured to be common to the first compartment and the second compartment.

In another aspect, at least one common interior wall section engages a monument post, the monument post configured to engage a support structure, said support structure in communication with at least one of: an aircraft cabin ceiling component, an aircraft cabin floor component, and an outboard wall component.

In another aspect, the integral combined monument further comprises a plurality of monument posts.

In another aspect, at least one monument post is configured to be secured to at least one of: an aircraft cabin floor assembly; an aircraft cabin ceiling assembly; and a cabin outboard wall.

In a further aspect, at least one of the plurality monument posts is oriented at a corner of the monument.

In another aspect, at least two monument wall sections are configured to engage at least one monument post.

In another aspect, the galley component comprises a storage area, said storage area configured to be accessible from the lavatory.

In another aspect, the common wall section comprises a common wall section through opening.

In a further aspect, the common wall section through opening is adjacent to a storage area that can be a receptacle.

In another aspect, the storage area is located within the first compartment and the storage area is accessible from the second compartment via the common wall section through opening.

Present aspects further disclose an aircraft cabin monument comprising an integral combined monument, with the at least one integral combined monument including at least one compartment, and a monument exterior area, or monument footprint. At least a portion of the monument exterior area is oriented immediately adjacent to an aircraft cabin egress area, with the aircraft egress area including an attendant area. The integral combined monument further includes a plurality of monument wall sections, with the plurality of monument wall sections configured to be joined to form the integral combined monument, with the plurality of monument wall sections configured to further form at least one compartment within said monument. The integral combined monument further includes at least one common interior wall section.

In another aspect, the integral combined monument comprises at least one compartment comprising a monument footprint, with at least of portion of said monument footprint oriented immediately adjacent to an egress area, with the egress area comprising an attendant area, and a plurality of monument wall sections, with the plurality of monument wall sections configured to be joined to form said integral combined monument, and with the plurality of monument wall sections configured to further form at least one compartment within said integral combined monument In another aspect, the integral combined monument further comprises a first compartment and a second compartment, with the integral combined monument further comprising at least one common interior wall section, with the at least one common interior wall section in communication with the first compartment and the second compartment, and with the common interior wall section configured to be common to the first compartment and the second compartment.

In another aspect, at least one of the first compartment and the second compartment is configured to comprise a lavatory.

In a further aspect, at least one of the first compartment and the second compartment is configured to comprise a galley component.

In another aspect, each of at least two monument wall sections both abut an egress pathway, said egress pathway adjoining an attendant area.

In another aspect, the integral combined monument further comprises at least one monument post, with the at least one monument post in communication with at least one of said plurality of monument wall sections.

In a further aspect, the at least one common interior wall section is configured to engage at least one monument post.

In a further aspect, the at least one common interior wall section is configured to engage at least one of a plurality of monument posts.

In another aspect, at least one of the plurality of monument posts is configured to engage a support structure, with the support structure comprising at least one of: an aircraft cabin ceiling assembly, an aircraft cabin floor assembly, and an outboard wall assembly.

In a further aspect, at least one compartment comprises a recessed storage area, with the recessed storage area in communication with the common interior wall section, and with the recessed storage area comprising a common wall section through opening.

In another aspect, the common interior wall section through opening is in communication with a receptacle, with the receptacle located within at least one of the first compartment and the second compartment, with the receptacle configured to be accessible from at least one of the first compartment and the second compartment via the common wall section through opening.

In another aspect, at least two walls of the integral combined monument abut an egress pathway, said egress pathway adjoining an attendant area.

In another aspect, the common interior wall section is configured to be common to the first compartment and the second compartment.

In a further aspect, at least one common interior wall section engages a monument post.

In another aspect, the monument further comprises a plurality of monument posts, said monument posts in communication with said monument wall sections.

In a further aspect, the lavatory comprises a recessed storage area.

In another aspect, the galley component comprises a storage area, with the storage area configured to be accessible from the lavatory.

A further present aspect discloses a method for installing an aircraft cabin interior monument, with the method including providing a plurality of monument outer wall sections, providing a common interior wall section, and providing a plurality of posts, with the plurality of posts configured to engage at least one of: an aircraft cabin ceiling assembly, an aircraft cabin floor assembly, and an outboard wall assembly. A method further includes engaging at least two monument outer wall sections with at least one of the plurality of posts to form an integral combined monument in an aircraft cabin interior and engaging the interior wall section with at least one of the plurality of posts to form the common interior wall section, with the common interior wall section configured to divide a first compartment from a second compartment to form an integral combined monument.

In another aspect, the plurality of monument outer wall sections includes at least one first monument wall section having a first length, at least one second monument wall section having a second length, said second length different from the first length, and at least one third monument wall section having a third length, said third length different from the first length and second length.

In another aspect, a method further includes forming an aircraft cabin interior monument comprising a first compartment and a second compartment, wherein the first compartment and said second compartment include a common interior wall section.

A further aspect is directed to a method for installing an aircraft cabin interior monument, with the method including providing a plurality of monument outer wall sections of varying lengths, providing a common interior wall section, providing a plurality of posts, said plurality of posts configured to engage at least one of: an aircraft cabin ceiling assembly, an aircraft cabin floor assembly, and an outboard wall assembly, engaging at least two monument outer wall sections with at least one of the plurality of posts to form an integral combined monument in an aircraft cabin interior, and engaging the interior wall section with at least one of the plurality of posts to form the common interior wall section, said common interior wall section configured to divide a first compartment from a second compartment to form the integral combined monument.

In another aspect, a method further includes forming an integral combined monument wherein said aircraft cabin interior monument comprises six sides.

In another aspect, a method further includes orienting the integral combined monument adjacent to an aircraft cabin attendant area and further orienting the integral combined monument adjacent to an aircraft cabin egress area.

Another aspect is directed to a method for installing an aircraft cabin interior monument, with the method comprising providing a plurality of monument outer wall sections, with the plurality of monument outer wall sections comprising at least one first monument wall section having a first length, at least one second monument wall section having a second length, and with the second length different from the first length, and at least one third monument wall section having a third length, and with the third length different from the first length and second length. The method further comprises providing a common interior wall section, providing a plurality of posts, at least one of said plurality of posts configured to engage at least one of: an aircraft cabin ceiling assembly, an aircraft cabin floor assembly, and an outboard wall assembly, engaging at least two of the plurality of monument outer wall sections with at least one of the plurality of posts to form an integral combined monument in an aircraft cabin interior, with the integral combined monument comprising at least one compartment, and engaging the common interior wall section with at least one of the plurality of posts to form the common interior wall section.

The features, functions and advantages that have been discussed can be achieved independently in various aspects or may be combined in yet other aspects, further details of which can be seen with reference to the following description and the drawings.

BRIEF DESCRIPTION OF THE DRAWINGS

Figure 1:
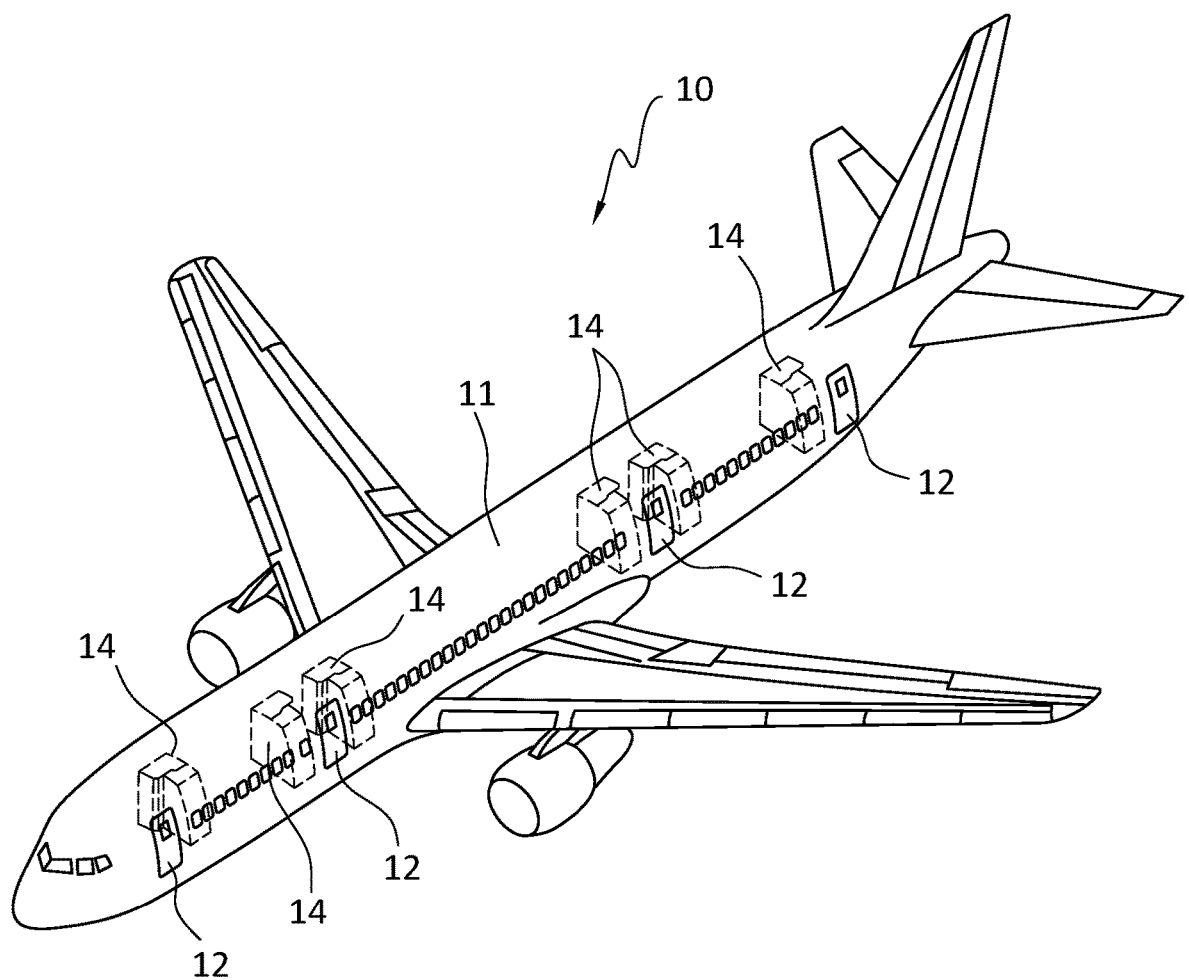
Figures 2, 3:
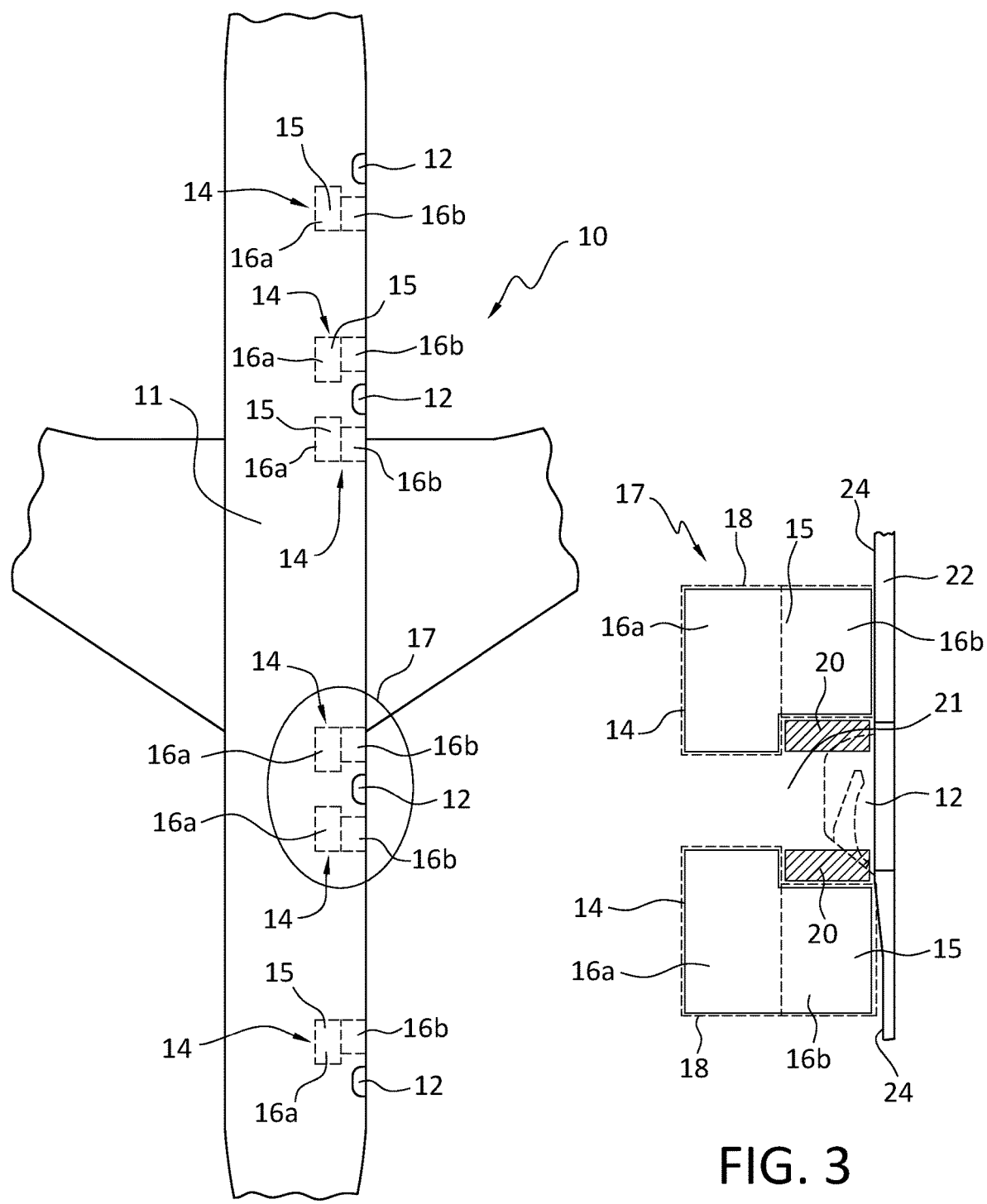
Figure 4A:
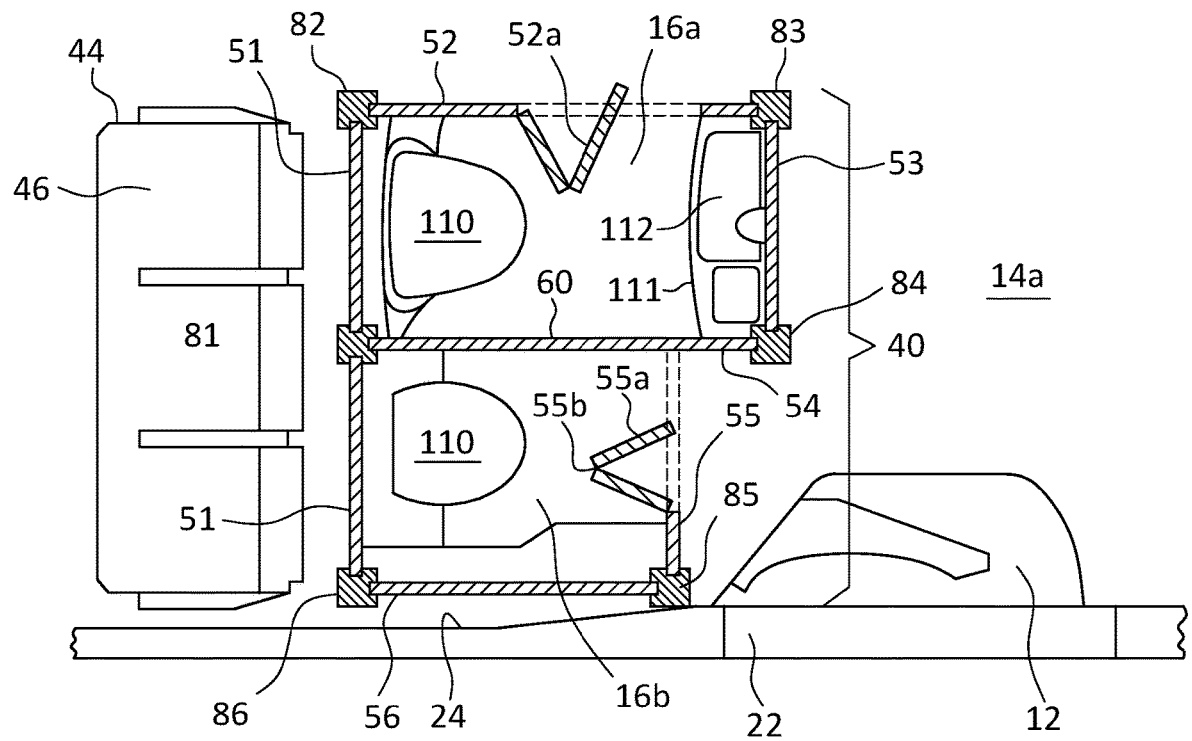
Figure 4B:
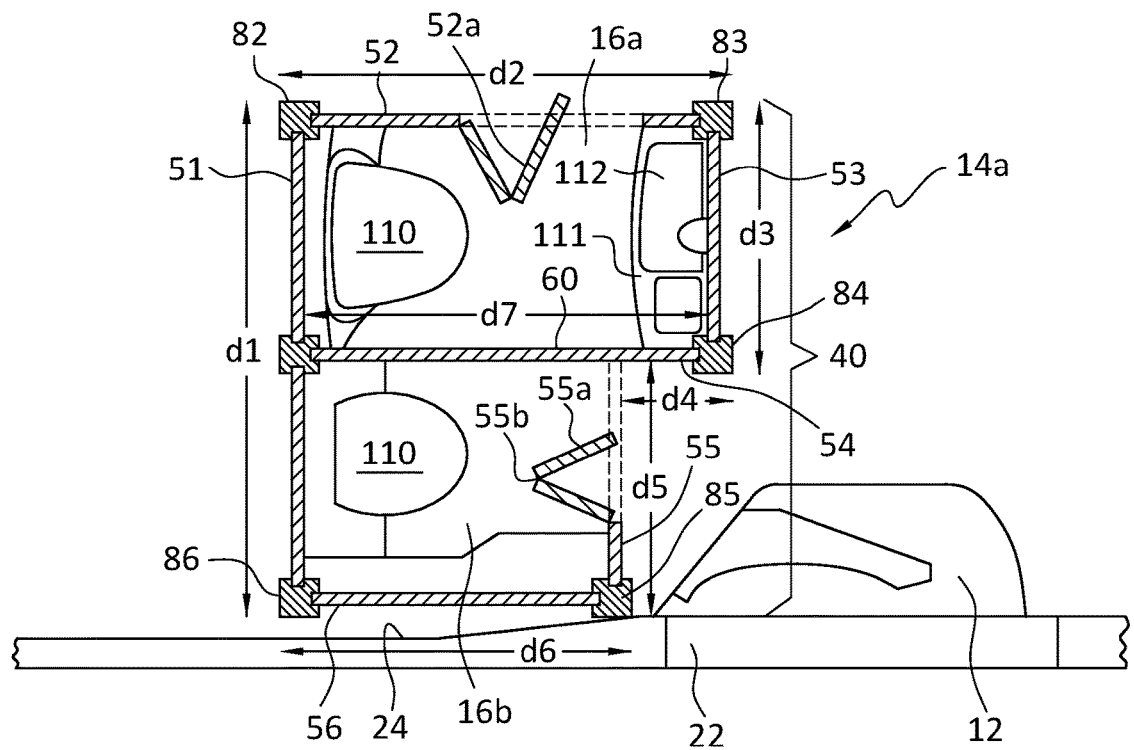
Figure 5:
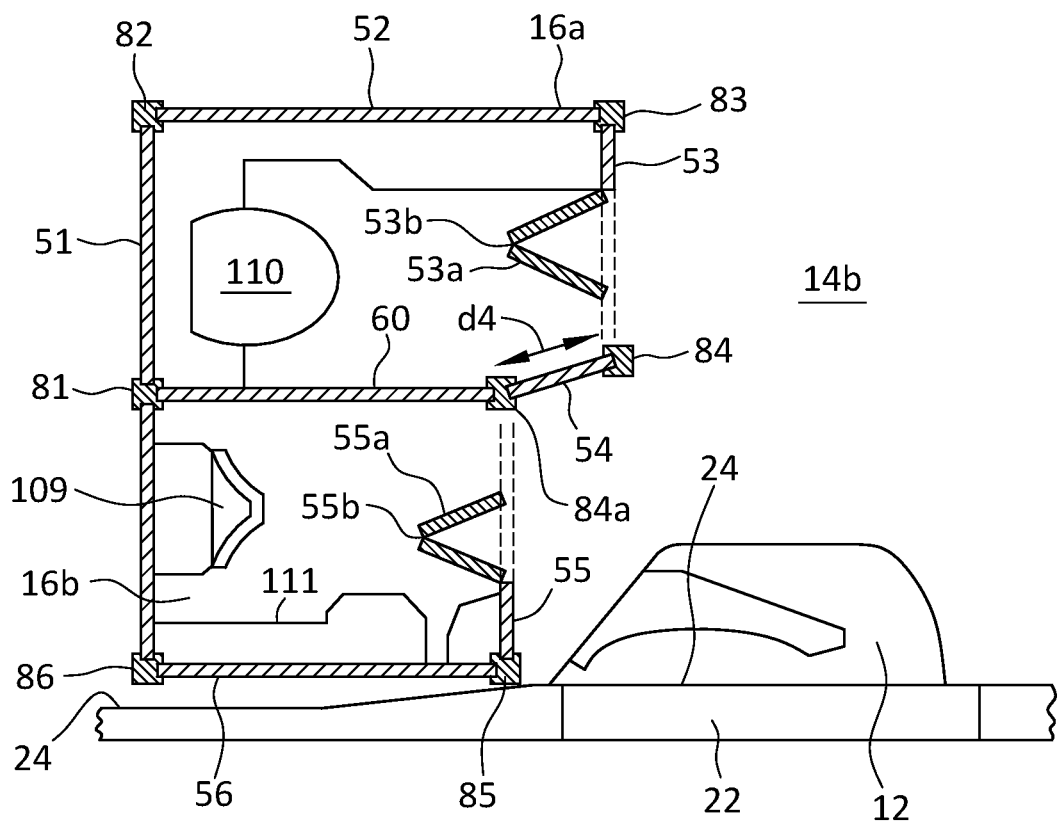
Figure 6A:
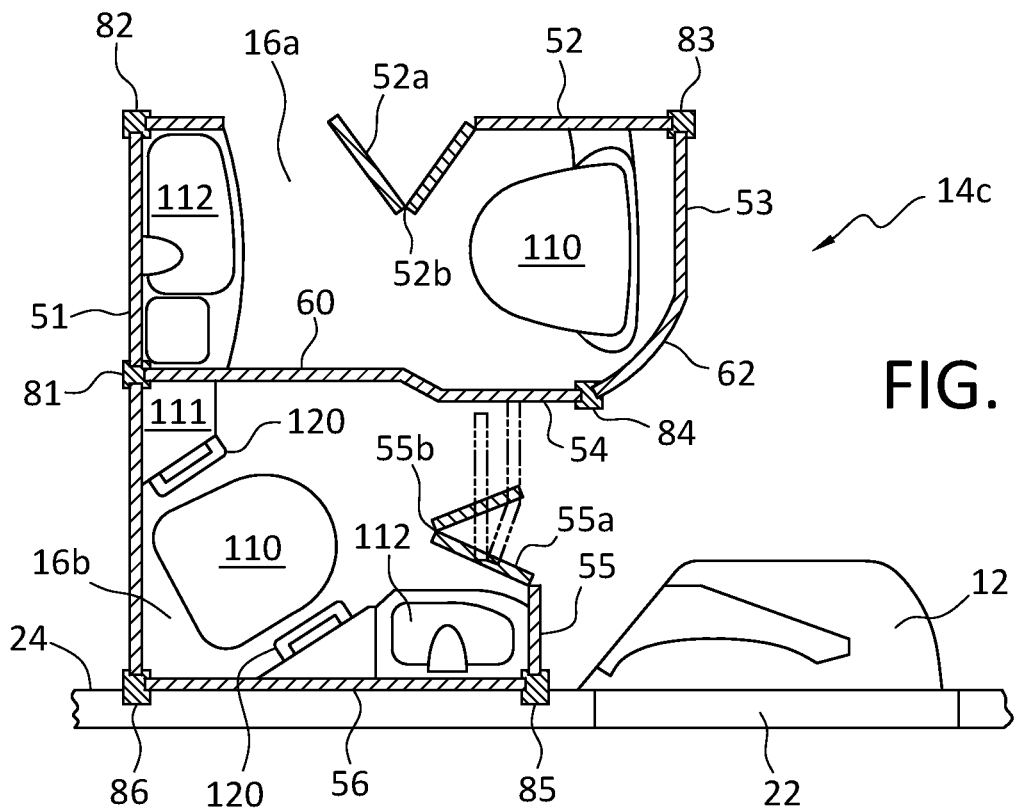
Figure 6B:
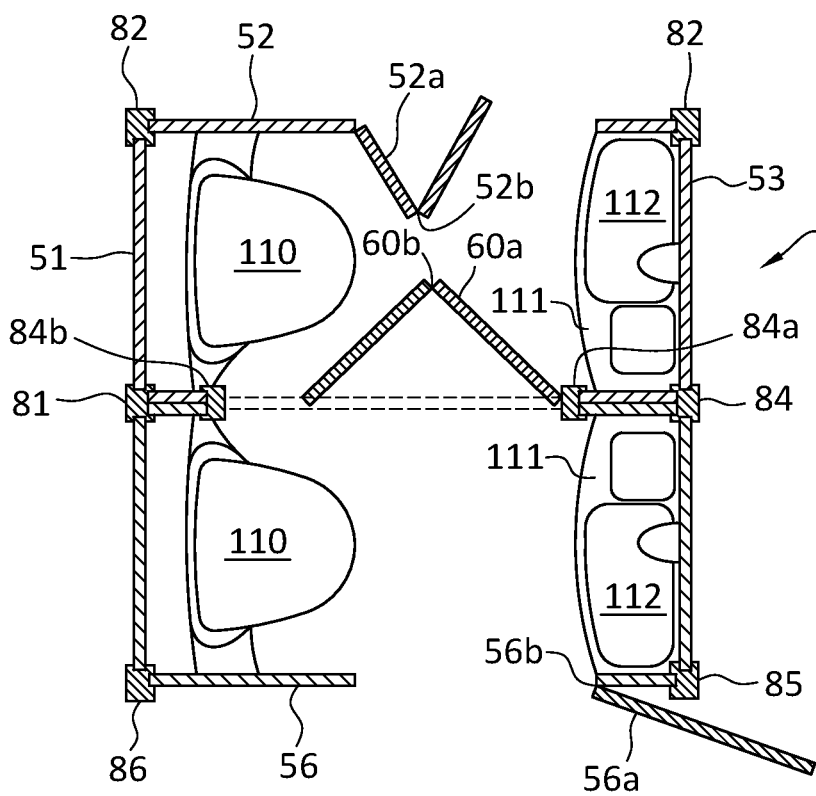
Figure 7:
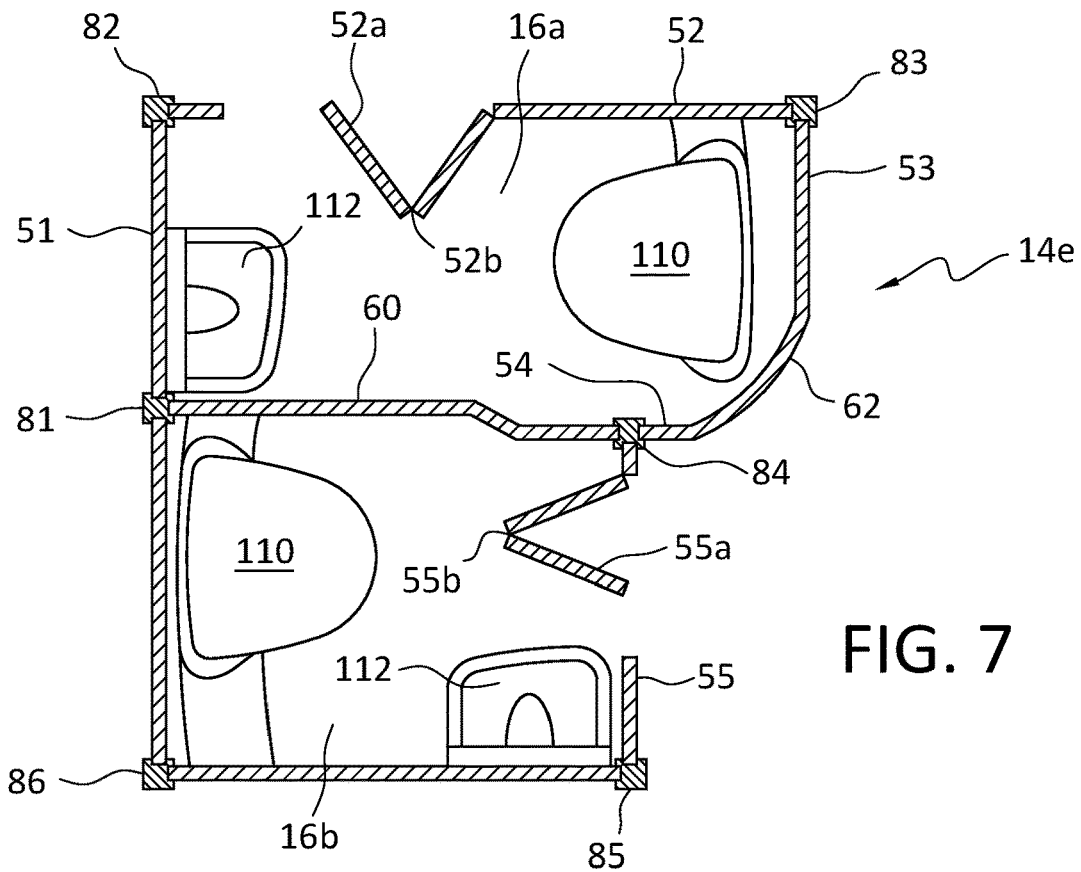
Figure 8:
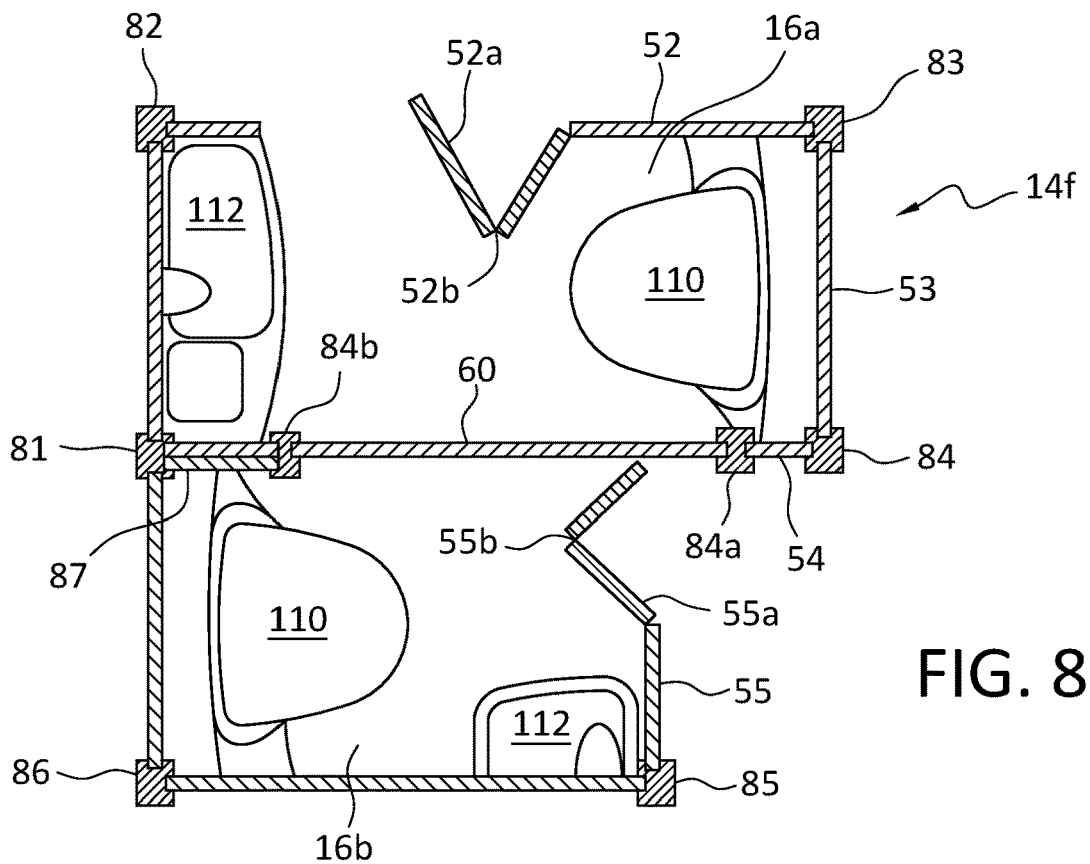
Figure 9:
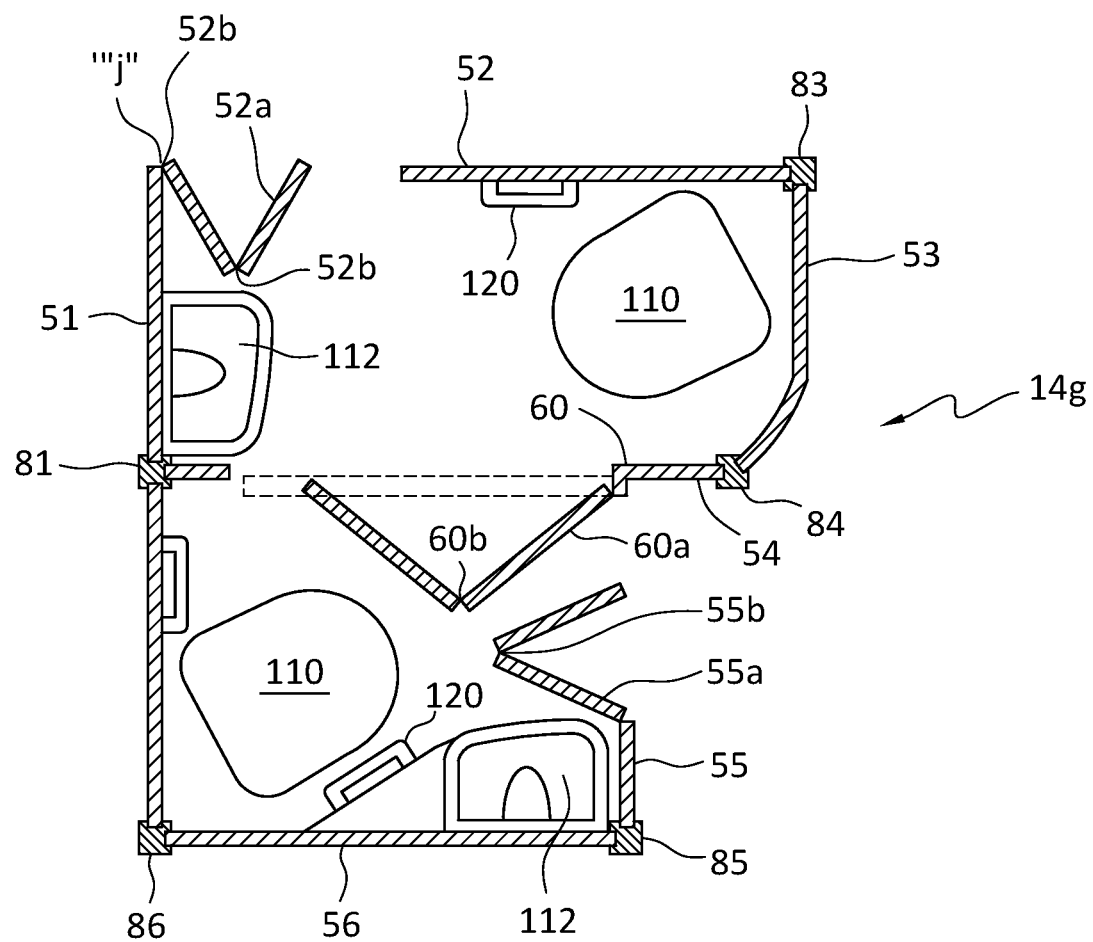
Figure 10:
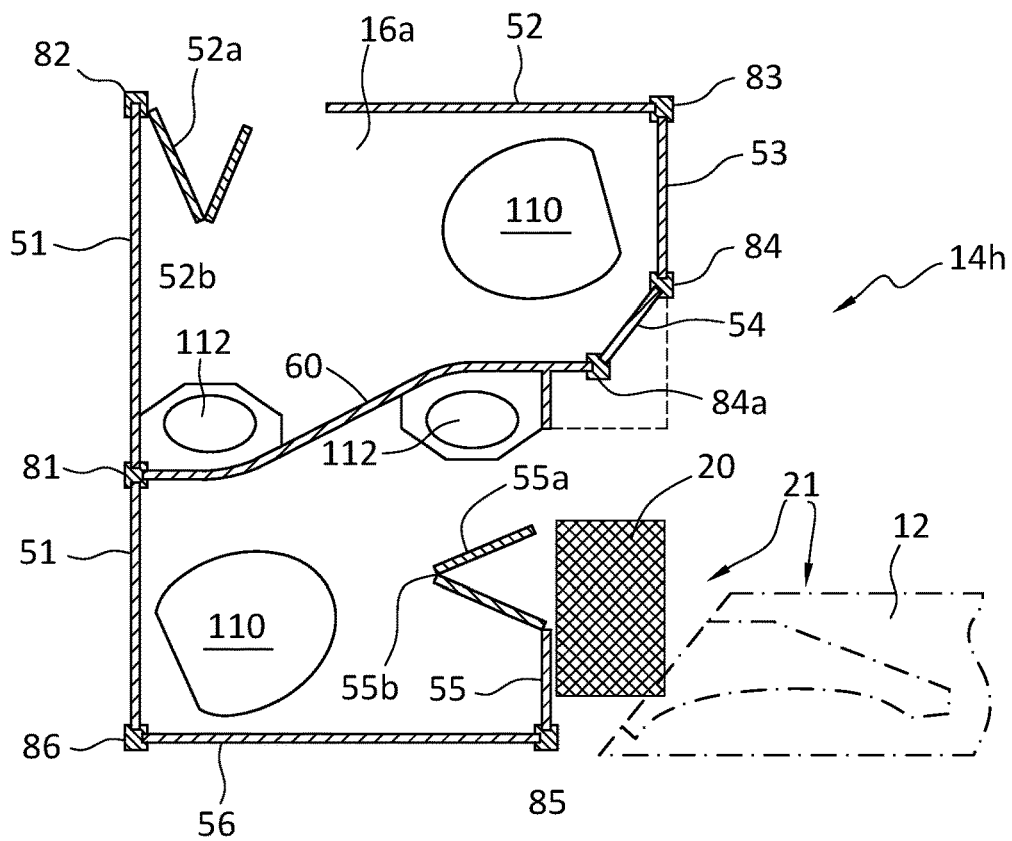
Figure 11:
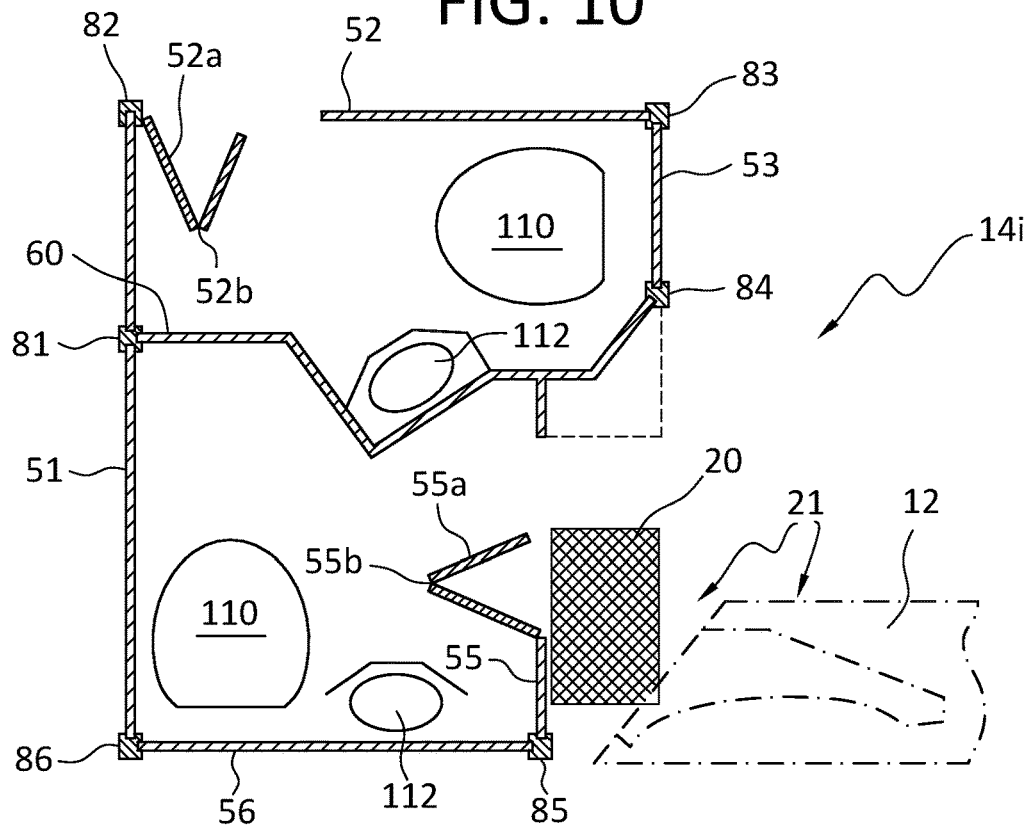
Figure 12:
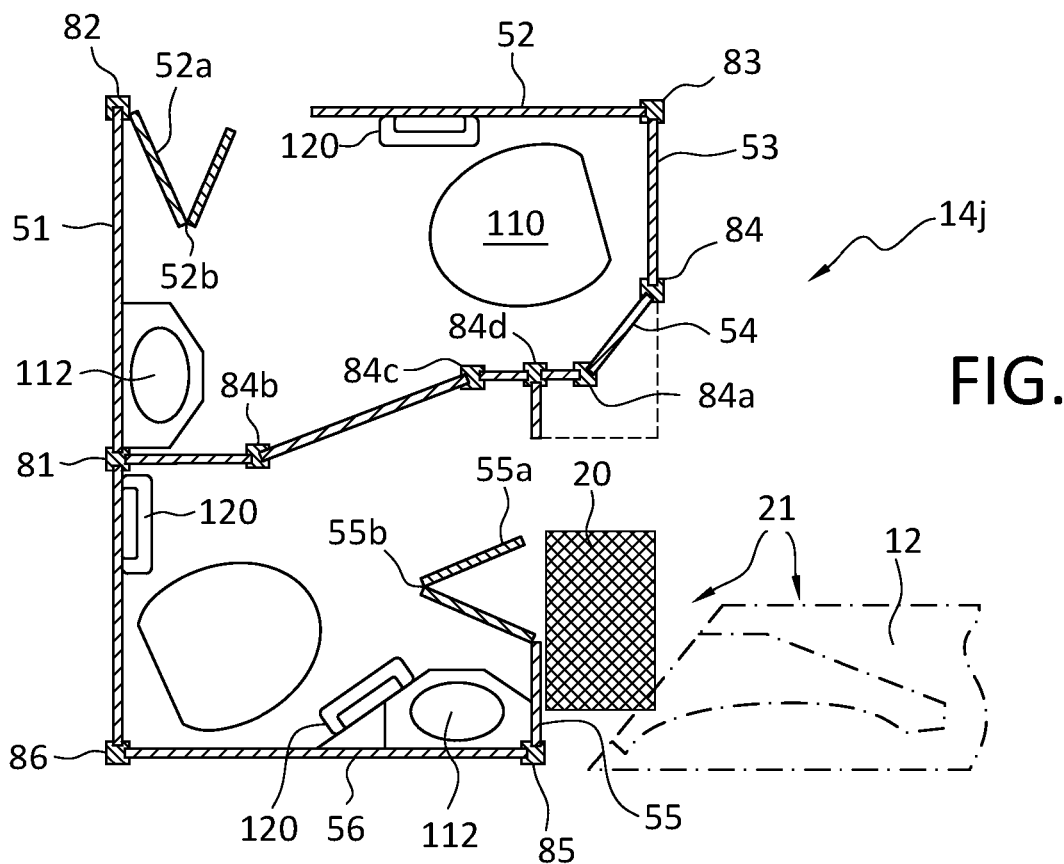
Figure 13:
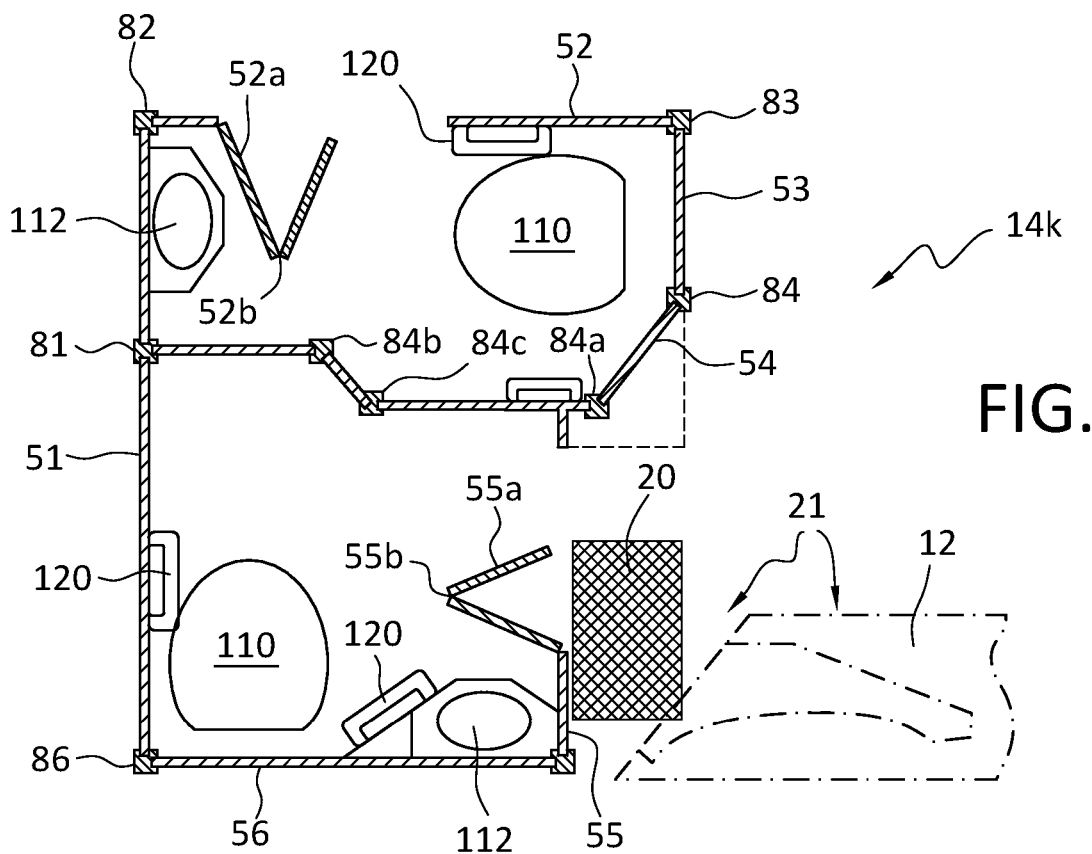
Figure 14:
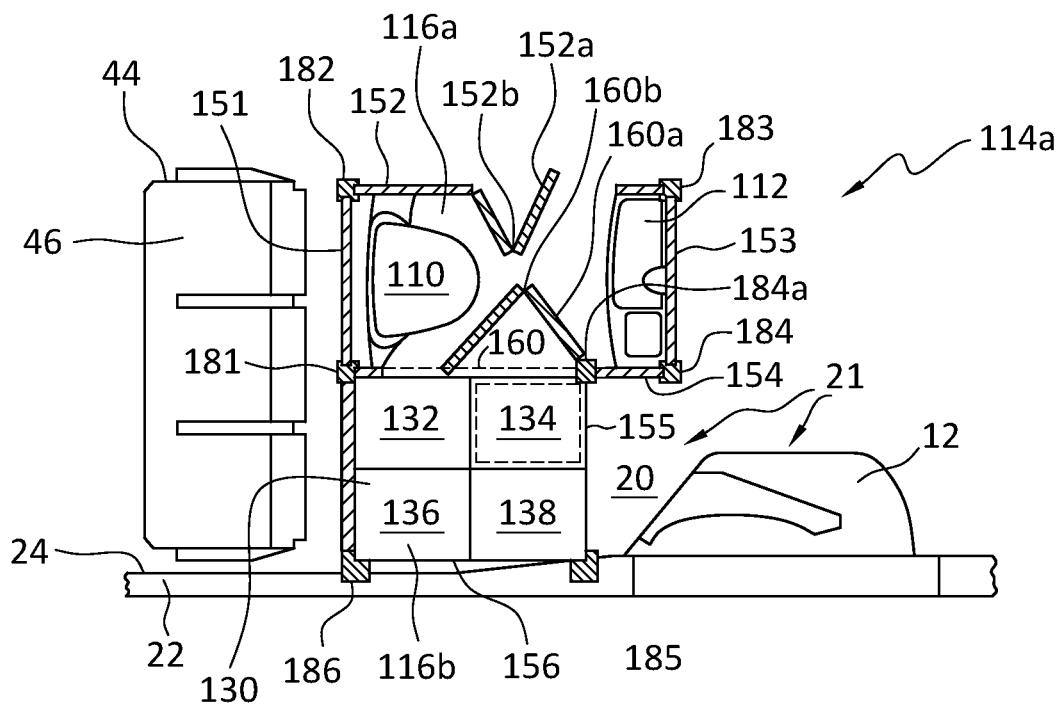
Figure 15:
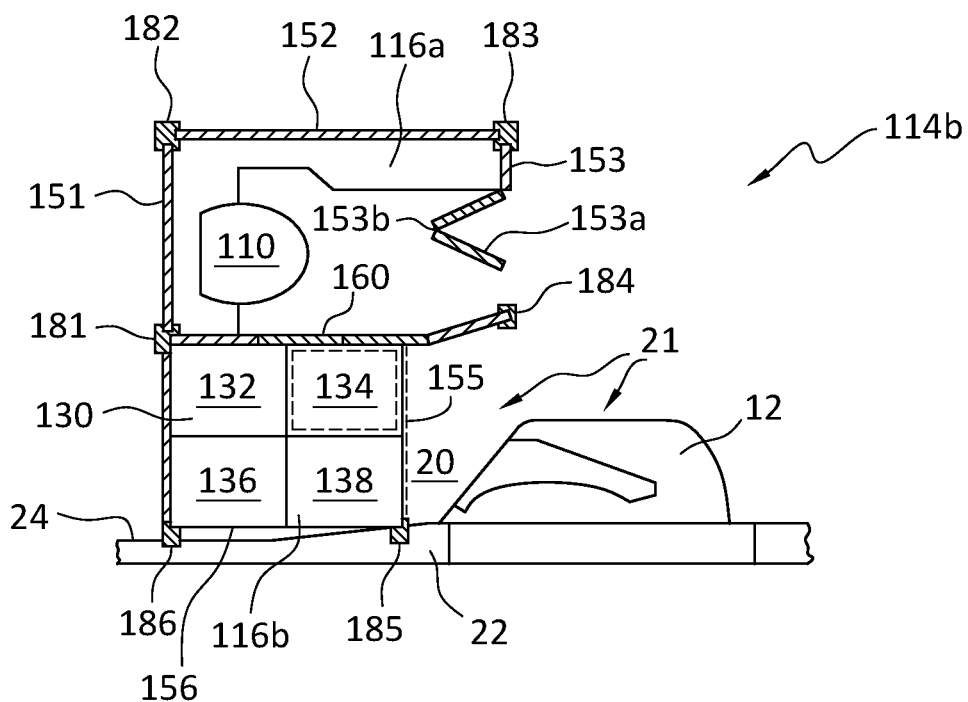
Figure 21:
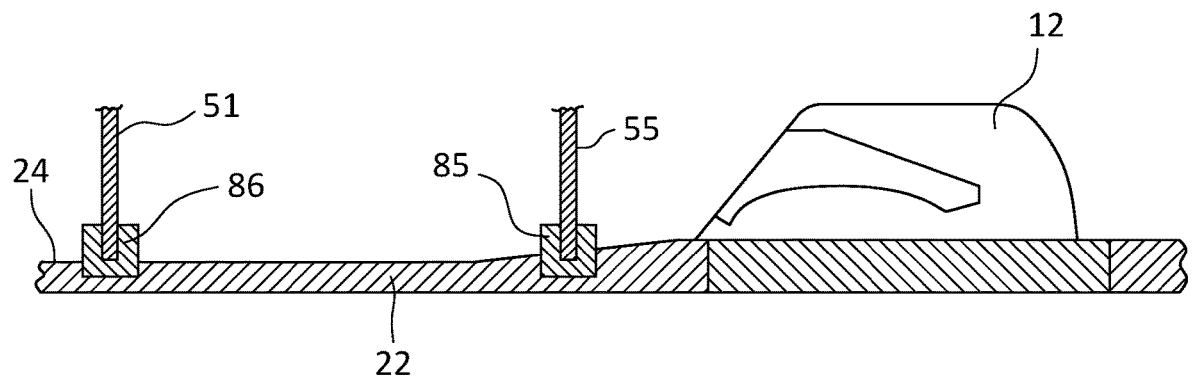
Figure 22:
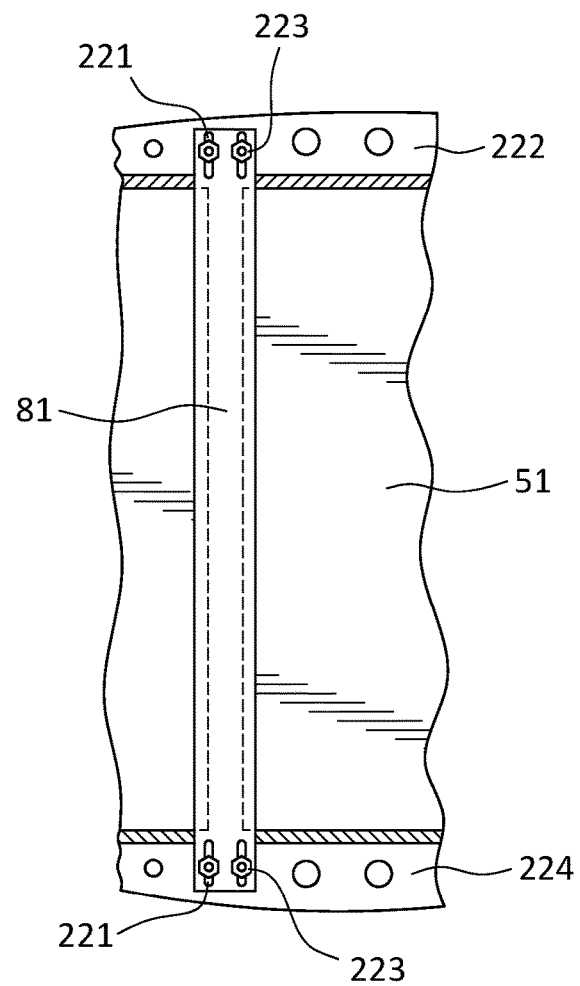
Figure 23:
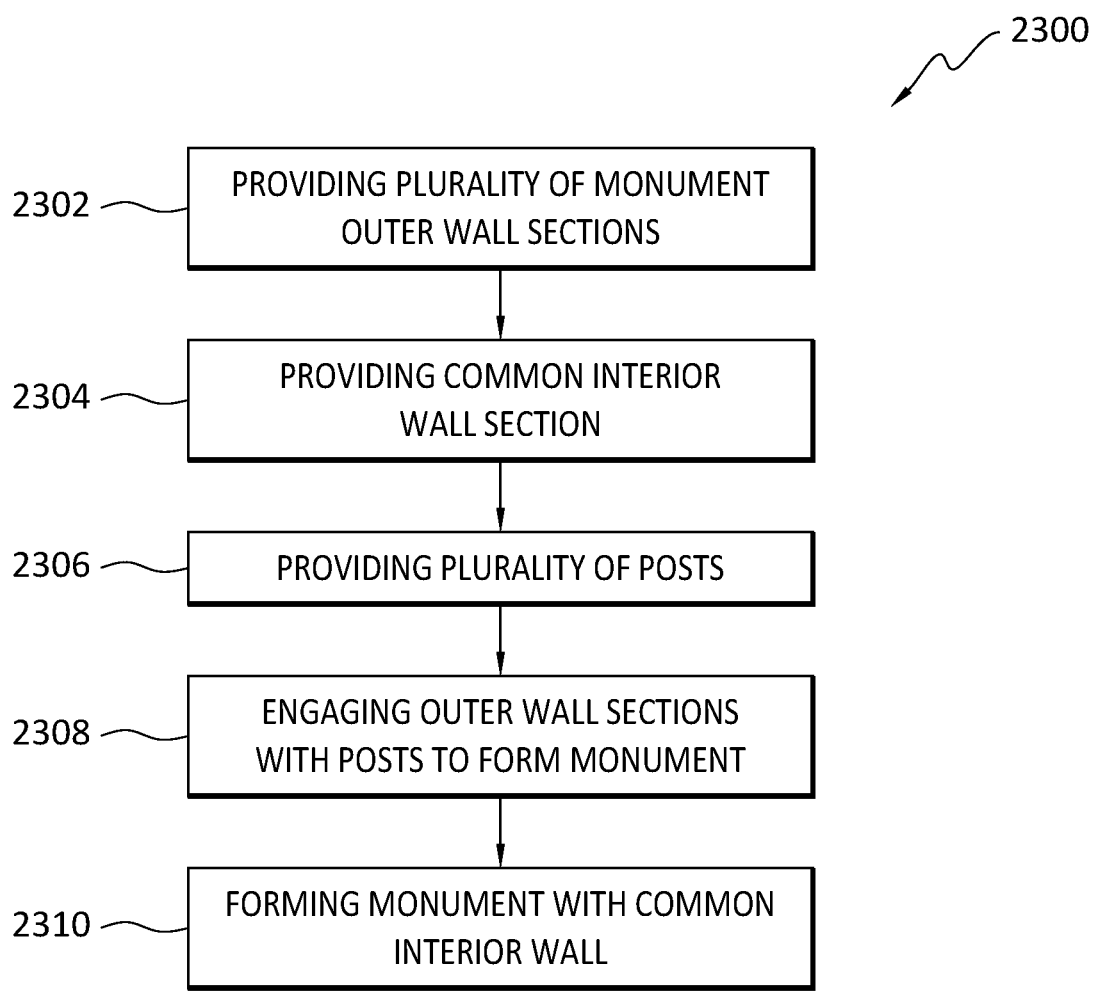
Figure 24:
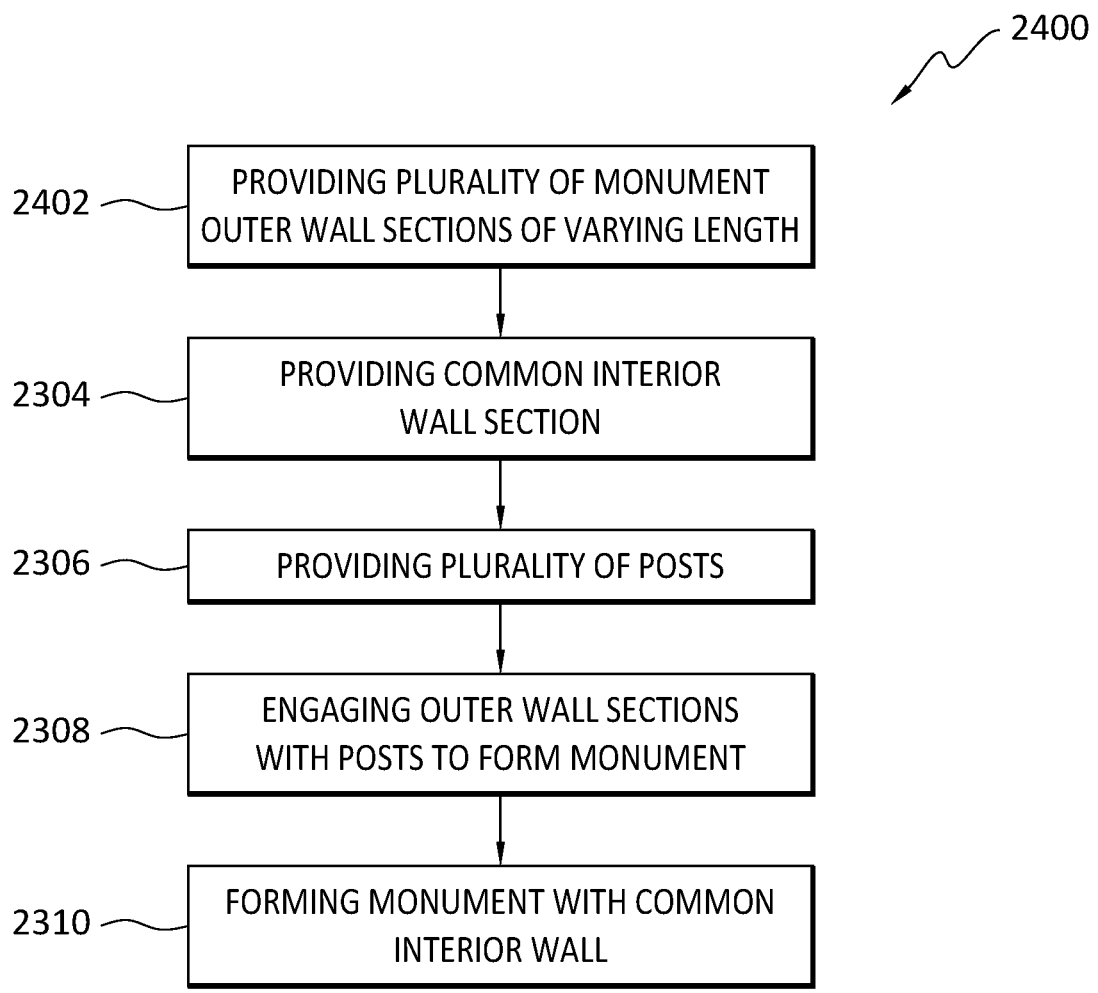
Figure 25:
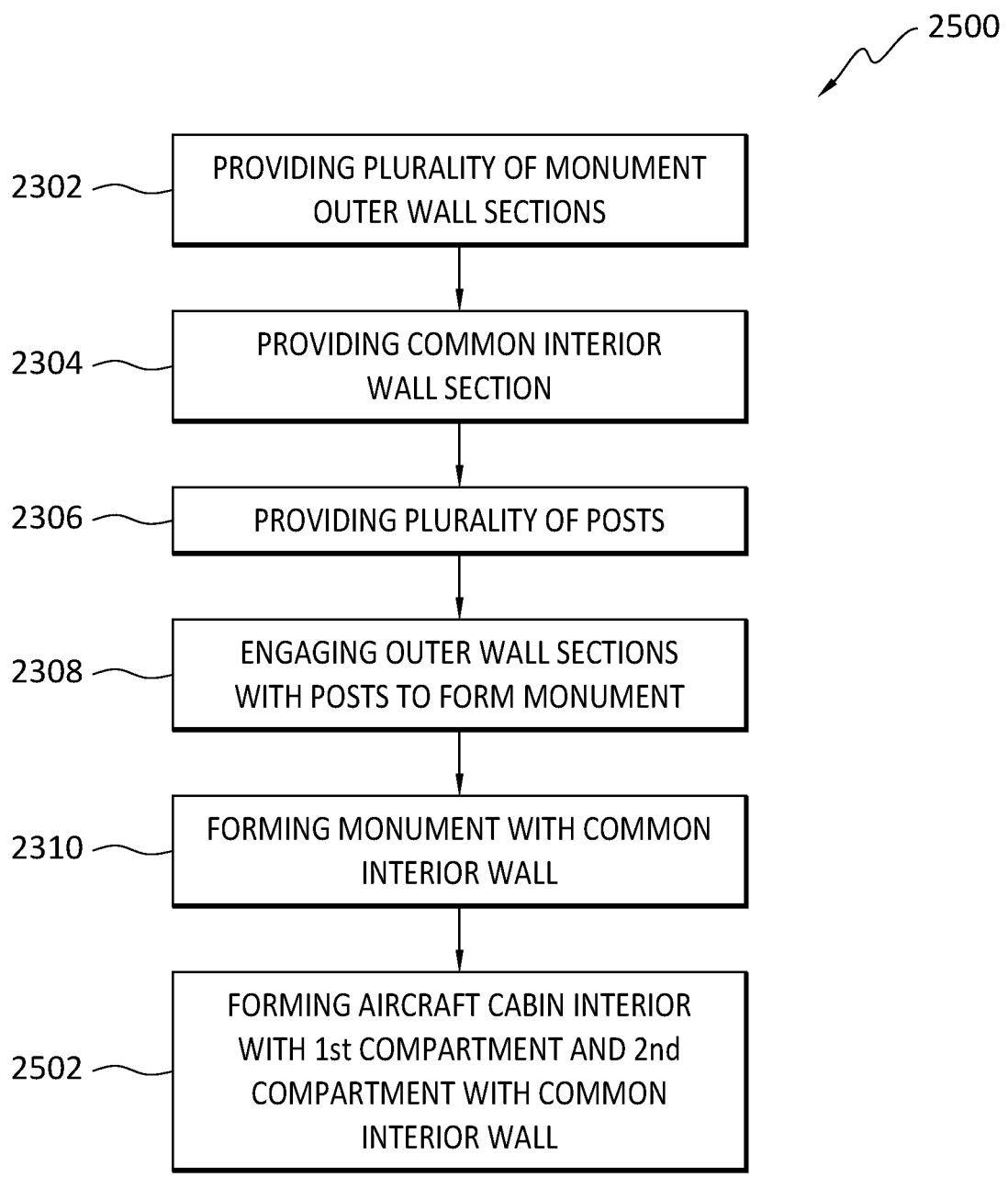

Having thus described variations of the disclosure in general terms, reference will now be made to the accompanying drawings, which are not necessarily drawn to scale, and wherein:

FIG. 1 is an illustration of an aircraft according to present aspects;

FIG. 2 is a representative, partially exposed view of an aircraft showing exemplary monument location according to present aspects;

FIG. 3 is an overhead representative view of an integral combined monument according to present aspects;

FIG. 4A is an overhead representative view of an integral combined monument according to present aspects;

FIG. 4B is an overhead representative view of an integral combined monument according to present aspects;

FIG. 5 is an overhead representative view of an integral combined monument according to present aspects;

FIG. 6A is an overhead representative view of an integral combined monument according to present aspects;

FIG. 6B is an overhead representative view of an integral combined monument according to present aspects;

FIG. 7 is an overhead representative view of an integral combined monument according to present aspects;

FIG. 8 is an overhead representative view of an integral combined monument according to present aspects;

FIG. 9 is an overhead representative view of an integral combined monument according to present aspects;

FIG. 10 is an overhead representative view of an integral combined monument according to present aspects;

FIG. 11 is an overhead representative view of an integral combined monument according to present aspects;

FIG. 12 is an overhead representative view of an integral combined monument according to present aspects;

FIG. 13 is an overhead representative view of an integral combined monument according to present aspects;

FIG. 14 is an overhead representative view of an integral combined monument according to present aspects;

FIG. 15 is an overhead representative view of an integral combined monument according to present aspects;

FIG. 16 is a representative view of a galley portion of an integral combined monument according to present aspects;

FIG. 17 is a representative view of a galley portion of an integral combined monument according to present aspects;

FIG. 18 is a representative view of a galley portion of an integral combined monument according to present aspects;

FIG. 19 is a representative view of a galley portion of an integral combined monument according to present aspects;

FIG. 20 is a representative view of a galley portion of an integrated monument according to present aspects;

FIG. 21 is an overhead view of a section of an integrated combined monument according to present aspects;

FIG. 22 is a perspective view of a post securing a portion of a wall section of an integral combined monument according to present aspects;

FIG. 23 is a flowchart outlining a method according to present aspects;

FIG. 24 is a flowchart outlining a method according to present aspects;

FIG. 25 is a flowchart outlining a method according to present aspects; and

Figure 26:
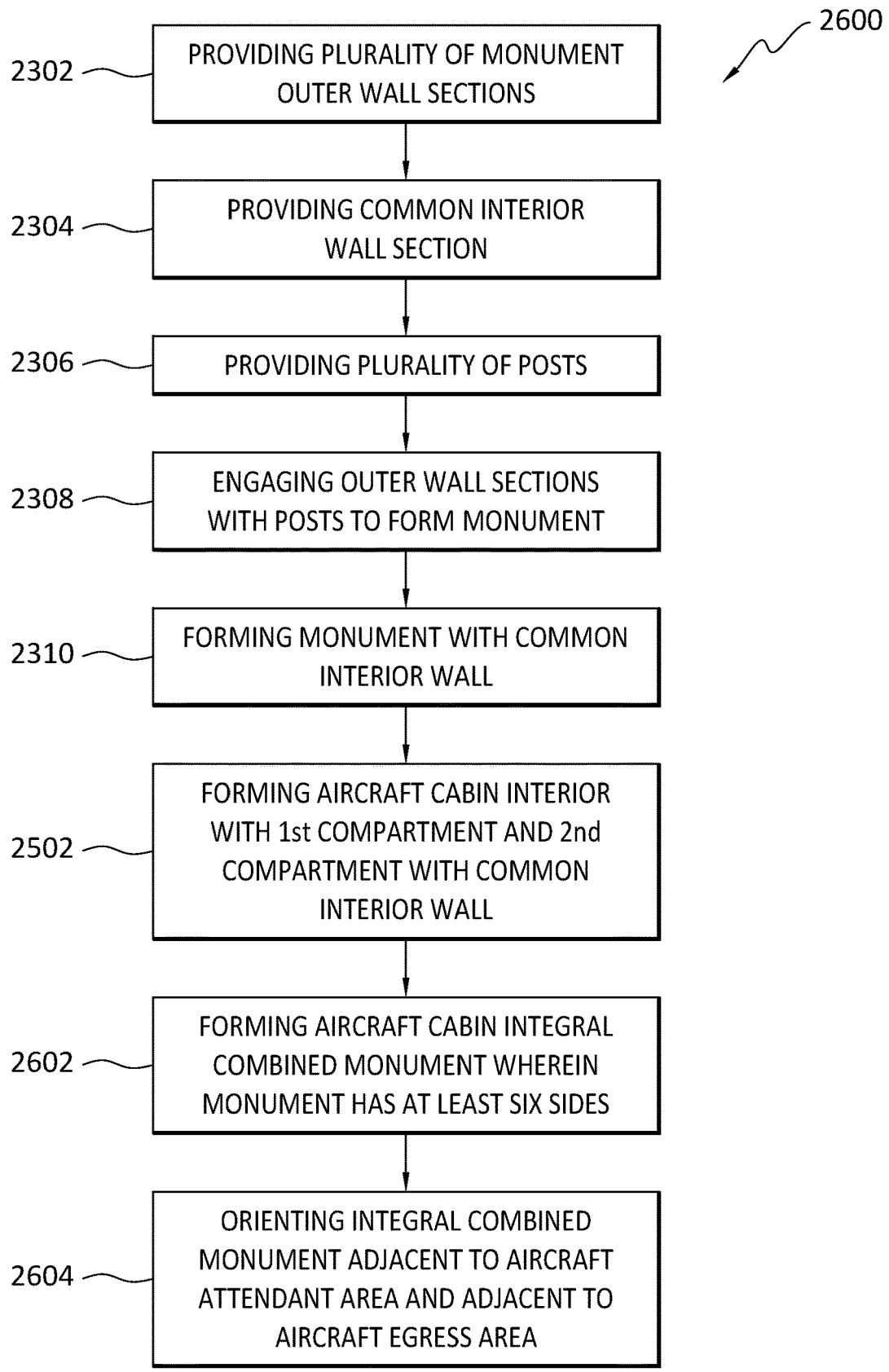

FIG. 26 is a flowchart outlining a method according to present aspects.

DETAILED DESCRIPTION

Dimensional norms of monuments in aircraft cabin interiors have benefitted the airline industry in terms of standardization. According to present aspects, space-saving integral combined monuments for aircraft interiors are presented that can economize space by providing a common interior wall to separate compartments in a combined monument, and by providing wall sections of varying length to construct an integral combined monument having more than 4 sides to allow such combined monuments to be incorporated into an aircraft interior design in a location that can abut or adjoin an egress pathway, attendant area or other space that had been previously rendered unused during flight, for example, due to regulations governing the space restrictions for an emergency egress from an aircraft, etc.

According to present aspects, aircraft cabin interior monuments are disclosed that combine traditionally separate monuments into a single monument comprising a common inner wall between the traditionally discrete and separate monuments. According to present aspects, the combined monuments conserve space, utilize previously unused space within an aircraft cabin, reduce an overall monument footprint, share at least one common wall between the integral combined monuments, reduce overall monument weight of the monument as combined with monuments that are not integrally combined, simplify monument construction and installation, while offering enhanced monument versatility and tailorability.

According to present aspects, FIG. 1 shown an aircraft 10 having multiple aircraft doors 12 and an aircraft cabin interior 11 having multiple aircraft cabin interior integral combined monuments 14 (referred to equivalently herein as "monuments"), shown in dotted lines. FIG. 2 is an exposed overhead view of the aircraft 10 shown in FIG. 1, showing present aspects, including representative placement and representative orientation of multiple aircraft doors 12 and an aircraft cabin interior 11 having multiple aircraft cabin interior integral combined monuments 14.

FIG. 2 is an overhead and partially exposed representative view of the aircraft 10 shown in FIG. 1. As shown in FIG. 2, according to present aspects, the integral combined monuments 14 within aircraft 10 reside in aircraft cabin interior 11, with integral combined monuments 14 comprising a monument interior that further comprises a monument first compartment 16a and a monument second compartment 16b. As shown in FIG. 2, the monument first compartment 16a and a monument second compartment 16b are integral with one another and are "combined" together within the monument interior space 15 of integral combined monument 14. FIG. 2 further shows an encircled aircraft cabin interior monument area 17.

According to present aspects, FIG. 3 shows an enlarged overhead view of aircraft cabin interior monument area 17 shown in FIG. 2. As shown in FIG. 3, monument area 17 comprises integral combined monuments 14 that, in turn, comprise an integral combined monument interior space 15. Integral combined monuments 14 further comprise a monument first compartment 16a and a monument second compartment 16b. FIG. 3 also shows aircraft door 12 positioned between aircraft cabin interior monuments 14, with the aircraft door 12 in the closed position and positioned adjacent to and otherwise comprising a portion of an outboard wall 22, with the outboard wall 22 comprising an outboard wall interior 24 exposed into and otherwise facing the aircraft cabin. FIG. 3 further shows, according to present aspects, an attendant area 20 located adjacent to monument 14. A portion of the attendant area 20 coincides with an egress pathway 21 (equivalently referred to herein as an "egress area"). As shown, the monument 14 has an outside or exterior perimeter and a total volume that is equivalent to a monument footprint 18, in terms of overall area taken up by the monument 14.

According to present aspects, the integral (referred to equivalently here as "integrated") combined monuments comprise at least two compartments, or a single compartment that can be converted into at least two compartments such as, for example, a first and second compartment. In further aspects, the monument can comprise or otherwise be converted from separate compartments into a single, large compartment. For present purposes, the term aircraft cabin interior "monument" refers to an enclosed area or object having a stated footprint, or total enclosed area, existing in an aircraft cabin interior such as, for example, a lavatory, a galley section, etc. Such enclosed areas or objects have been previously provided and/or installed as stand-alone units having full, and typically fixed perimeters about their area and typically fixed overall dimensions. According to present aspects, the monuments described herein represent areas that can be constructed on site such that, for example, the monument contains a plurality of integral combined compartments with the compartments oriented within a monument footprint, and with the plurality of compartments sharing at least one common wall, with the compartments being convertible or "tailorable" into various predetermined configurations on demand.

As evidenced by the accompanying FIGs. herein, the compartments within the integral monument can be configured into various configurations including, but not limited to configurations shown in the accompanying FIGs. such as, for example: first and second integrated lavatories; first and second integrated (e.g., separate and discrete) lavatories that can convert to a single larger lavatory to accommodate, for example, persons having restricted mobility (PRM) lavatories; a lavatory integrated with a galley section; first and second galley sections, etc. According to the present disclosure, the terms "Persons with Restricted Mobility", "Passengers with Restricted Mobility", "Persons with Reduced Mobility" and/or "Passengers with Reduced Mobility" are equivalent terms that can be used interchangeably, and all such equivalent terms are covered by the abbreviation "PRM".

Exemplary variations of aircraft cabin interior monument 14 (equivalently referred to herein as "monument") are shown herein in the FIGs as monuments 14a, 14b, 14c, 14d, 14e, 14f, 14g, 14h, 14i, 14j, and 14k. According to present aspects, FIGS. 4A, 4B, 5, and 6A are overhead views of an integral combined monument 14a, 14b, 14c, respectively, in an aircraft cabin interior that can be of the type shown in one or more of FIGS. 1, 2, and/or 3 (e.g., considered to be a particular type of monument 14 shown in FIGS. 1, 2, and/or 3, etc.).

As shown in FIG. 4A, an integral combined monument 14a comprises a monument first compartment 16a and a monument second compartment 16b. As shown in FIG. 4A, monument first compartment 16a houses a monument first area configured into a first lavatory. FIG. 4A further shows monument second compartment 16b housing a monument second area configured into a second lavatory, with monument common interior wall 60 separating first compartment 16a from second compartment 16b. FIG. 4A also shows aircraft door 12 positioned adjacent aircraft cabin interior monument 14a, with the aircraft door 12 in the closed position and positioned adjacent to and otherwise comprising a portion of an outboard wall 22 of aircraft 10, with the outboard wall 22 comprising an outboard wall interior 24 exposed into and otherwise facing the aircraft cabin. FIG. 4A shows aircraft cabin interior integral combined monument 14a comprising monument wall sections, 51, 52, 53, 55, 56 that can be considered to be first, second, third, fifth and sixth wall sections, respectively, and that together form a significant portion of a perimeter of integral combined monument 14a. As shown in FIG. 4A, monument first wall section 51 can comprise two segments that can be linear. In an alternate aspect, not shown in FIG. 4A, monument wall section 51 can be a single segment.

FIG. 4A further shows integral combined monument common interior wall section 60. As shown in FIG. 4A, a portion of common interior wall section 60 can extend from compartment 16b. The portion of common interior wall section 60 extending beyond compartment 16b can be considered to be a fourth wall section 54 that together with first wall section 51, second wall section 52, third wall section 53, fifth wall section 55 and sixth wall section 56 together the perimeter of integral combined monument 14a. As disclosed herein, as shown in FIG. 4A, second wall section 52 and fifth wall section 55 are shown comprising a folding section, and with the second wall section 52 and fifth wall section 55 in a folded orientation.

Focusing on the overall dimension of the integral combined monument overall dimension, or monument "footprint", FIG. 4B shows an overhead view of integral combined monument 14a as shown in FIG. 4A, having a plurality of compartments 16a, 16b and an overall monument footprint, according to present aspects. For representative purposes, the monument perimeter or "footprint" is simplified to highlight present aspects of a monument with respect to comparative dimensions of the various wall sections. FIG. 4B shows aircraft cabin interior integral combined monument 14a comprising monument wall sections, 51, 52, 53, 55, 56 (that are exterior wall sections) taken together with common interior wall section 60 to form a six-sided monument, according to a present aspect. Monument 14a further comprises monument common interior wall 60 separating first compartment 16a from second compartment 16b. Exterior first wall section 51 as shown has a length represented by length dimension "d1", exterior second wall section 52 has a length represented by length dimension "d2", exterior third wall section 53 has a length represented by length dimension "d3"; exterior fourth wall section 54 has a length represented by length dimension "d4"; exterior fifth wall section 55 has a length represented by length dimension "d5"; and exterior sixth wall section 56 has a length represented by length dimension "d6". According to a present aspect, at least the lengths represented by d1, d2 and d6 are each different from one another, with d6 being less than d2. In this way, with d6 being less than d2, fourth exterior wall section 64 and fifth exterior wall section 55 are required to form the six-sided monument 14a.

As shown in FIG. 4B it is understood that fourth exterior wall section 54 can be a separate wall section or can be a section of monument common interior wall 60 that extends beyond the perimeter of compartment 16b to the distance or length "d7"; e.g., with d7 being the length required to equal the length of monument common interior wall 60 and the length of the fourth exterior wall section 54, d4. In other words, fourth exterior wall section 54 can be an extension of monument common interior wall 60 that extends beyond the length d6 of sixth exterior wall section 56 to a length that equals d4. As shown in FIG. 4B, either separate exterior wall section 54 or the length of common interior wall 60 that extends beyond the length d6 of exterior wall 54 is required to enclose compartment 16a. When the common interior wall 60 is extended, the length shown as d7 can be substantially equivalent to the length of, for example, second wall section d2. When a separate fourth wall section 54 is present, the length of the common interior wall 60 can be equivalent to length d6, and the combined lengths of d4 and d6 can be substantially equivalent to the length d2.

FIGS. 4A and 5 show present aspects where one or more of various exterior wall sections, and/or the common interior wall can comprise a plurality of folding points at locations along their length to facilitate a predetermined folded configuration of such wall sections (wall sections referred to equivalently herein as wall segments), such as, for example, folding a section of an exterior wall section or common interior wall section in a direction (e.g., an inward direction, or an outward direction) into or out of the plane of a first or second compartment wall section, as desired. The predetermined dimensional folding of a wall section can be configured for multiple purposes. For example, folding mechanisms incorporated into wall sections can facilitate a wall section converting, upon demand, for example, into a door, for example, to gain entry into or exit from, a monument compartment. In further aspects, as described herein, such folding mechanisms incorporated into sections of the common interior wall can facilitate converting an integral combined monument comprising two compartments into one larger compartment (e.g., a larger compartment having a larger internal area of additional internal space, with the larger internal area measured, for example, in square feet of additional space). A larger compartment of such a monument can find use in, for example, better accommodating a person of restricted mobility (PRM) that may require wheelchair access or an accompanying person to assist the PRM, by providing the additional space required in a lavatory provided, for example, in compartment 16a.

Although not shown in FIGS. 4A and 5, further present aspects contemplate obviating the folded wall section configurations, and commensurately obviating the need for attendant folding mechanisms (and further saving on overall component weight, etc.). According to such aspects, the folding and folded wall sections can be replaced with wall sections (e.g., sliding wall sections) that are configured to migrate (e.g. in a sliding arrangement with or without sliding tracks) from a stowed orientation (e.g., within an adjacent wall section) to a deployed orientation. The wall section may include one or more segments (e.g., longitudinal segments) that allow the wall section to achieve a degree of flexibility as the wall sections, according to this aspect, migrate (e.g., in response to manual or automated force) from a stowed orientation to the deployed orientation. Such degree of flexibility can include longitudinally oriented "accordion-like" segments that can be repeatedly compressed and expanded during the migration from the stowed orientation to the deployed orientation. Further, the wall section can include longitudinal segments or can include a variety of materials (e.g., including materials having a varied modulus located throughout the length of the wall section), such that a wall section can have the degree of flexibility necessary to "bend" out-of-plane (e.g., as much as 90 degrees or more) as the wall section is moved from a stowed position to a deployed position, and then, if desired, returned from the deployed position to the stowed position, as could be the case for a wall section that operates as a monument or compartment door, and that can confront repeated movement from a stowed to a deployed condition. According to another aspect, such a wall section may be "nested" within or adjacent to another wall section, for example, similar to orientations of nested doors and wall components referred to as "pocket doors" or "pocket walls", etc.

FIGS. 6B, 9, and 14 show a monument common interior wall 60 that can be configured to fold along a longitudinal plane (a plane proceeding along the width or y-axis of the monument common interior wall 60) to form a common interior wall folding section 60a, with the monument common interior wall folding section 60a comprising at least one folding mechanism 60b that can be at least one element such as, for example, a mechanical device such as, for example, at least one hinge located at one or more predetermined folding points along its width and along the y-axis. According to present aspects, the length of wall segments or sections, including the monument common interior wall, have their length along the x-axis as presently depicted in the FIGs.

As shown in FIG. 4A, integral combined monument 14a comprises monument first wall section 51 (with first wall section 51 comprising more than one wall segment as shown in FIG. 4A, or with first wall section 51 comprising a single segment) that abuts monument second wall section 52 and that further abuts monument sixth wall section 56. Monument second wall section 52 abuts first wall section 51 and further abuts monument third wall section 53. Monument third wall section 53 abuts second wall section 52, and further abuts either common interior wall section 60 or fourth wall section 54 (for example, as shown in FIG. 5). When present as a separate wall section, fourth wall section 54 abuts third wall section 53 and fifth wall section 55 and common interior wall section 60. Fifth wall section 55 abuts fourth wall section 54 (when present) and further abuts sixth wall section 56. When common interior wall 60 extends beyond compartment 16b (with common interior wall 60 thus fulfilling the function of fourth wall section 54), common interior wall 60 abuts first wall section 51, third wall section 53, and sixth wall section 56. Finally, sixth wall section 56 abuts fifth wall section 55 and further abuts first wall section 51. Monument first wall section 51 further abuts monument common interior wall 60. Monument sixth wall section 56 is shown in FIG. 4A as oriented proximate to outboard wall interior 24 of outboard wall 22 of an aircraft cabin interior.

Monument second wall section 52 is shown in FIG. 4A as comprising a monument second wall folded section 52a, with monument second wall folded section 52a comprising a folding mechanism 52b that can be at least one element such as, for example, a mechanical device such as, for example, at least one hinge located at one or more predetermined folding points along its width and along the y-axis. Monument fifth wall section 55 is shown comprising a monument fifth wall folded section 55a, with monument fifth wall folded section 55a comprising a folding mechanism 55b that can be at least one element such as, for example, a mechanical device such as, for example, at least one hinge located at one or more predetermined folding points along its width and along the y-axis.

As stated herein, it is understood that monument fourth wall section 54 can be obviated by extending monument common interior wall 60 to the distance required to equal the length of extending monument common interior wall 60 and fourth exterior wall section 54. In other words, monument fourth wall section 54 can be an extension of monument common interior wall 60 that extends beyond the length d6 of monument sixth wall section 56. As shown in FIG. 4A, either separate exterior wall section 54 or the length of common interior wall 60 that extends beyond the length d6 of exterior wall 54 is required to enclose compartment 16a.

Though not shown in FIG. 4A, the common interior wall can be folded into a configuration that allows for passage between compartments 16a, 16b (e.g. at least a partially folded state). See, e.g., FIG. 9. As shown in FIG. 4A, a monument configuration is achieved allowing for passenger entry into compartment 16a via folded section 52a of the monument second wall section 52, and passenger entry into compartment 16b via folded section 55a of monument fifth wall section 55. When more space is needed in compartment 16b, common interior wall 60 can be moved from an initial linear common interior wall position by folding common interior wall 60 in a way that impinges or otherwise reduces the space in compartment 16a, and commensurately increases the interior dimension (e.g., available area) of compartment 16b.

Further, if desired, (and not shown in FIG. 4A) common interior wall 60 can be folded into a fully folded configuration to remove separation between compartments 16a, 16b and creating a monument have a large interior space, while the exterior monument footprint remains constant. In such a configuration, the monument is said to have a convertible configuration, with the integral combined two-compartment monument converted into a single large compartment. See e.g., FIG. 9.

As shown in FIGs, compartment 16a, and/or compartment 16b can comprise objects and appointments including, for example, a toilet 110, a shelf 111, a sink 112, a urinal 109 (urinal 109 shown in FIG. 5), etc. As shown, at least, in FIGS. 4A, 4B a toilet 110 and a sink 112 and shelf 111 are shown oriented with compartment 16a or 16b is a predetermined placement to achieve and maximize a predetermined area within compartments 16a, 16b. The objects and appointments contained with the monuments, according to present aspects, are oriented adjacent to, proximate to or near wall sections in a predetermined space-saving orientation that can facilitate a multitude of tailorable lavatory configurations and lavatory combination configurations that can be contained with compartments 16as, 16b of integral combined monument.

According to present aspects, the wall sections of the integral combined monuments can be configured to form the monument and the monument wall sections can be secured to one another directly, or the wall sections can be secured to one another indirectly. That is, present aspects contemplate facilitating assembly and/or installation of the monument, for example, by securing wall sections to one or more posts. According to present aspects, the posts can be secured to at least one aircraft structure, for example, at or near an end of the post. Aircraft structures to which the post can attach can include, for example, a ceiling assembly and support structures in communication with a ceiling assembly; a floor assembly, and support structures in communication with a floor assembly; outboard wall assembly and support structure in communication with outboard wall assemblies, etc. Examples of the support structures and posts are shown and more fully described at least in FIGS. 21 and 22.

Referring again to FIG. 4A, according to present aspects, an overhead view shows a portion of first wall section 51 and common interior wall 60 engaging post 81. According to an aspect, a portion of first wall section 51 and a portion of second wall section 52 engage post 82. As shown in FIG. 4A a portion of second wall section 52 and a portion of third wall section 53 engage post 83. As further shown in FIG. 4A, a portion of third wall section 53 and a portion of common interior wall 60 (or, when present, a portion of fourth wall section 54) engage post 84. Further, a portion of fifth wall section 55 and a portion of sixth wall section 56 engage post 85. In addition, a portion of sixth wall section 56 and a portion of first wall section 51 are shown in FIG. 4A as engaging post 86.

The posts and the wall section portions that engage with the posts can be fastened with any appropriate fasteners, or can otherwise engage the posts in a friction, or near-friction fit without the presence of fasteners. In addition, the posts and the wall section portions that engage with the posts can be secured together by appropriate mating of the parts. For example, according to present aspects, the post can comprise protrusions or recesses (shown, for example, at least in FIG. 22) having a predetermined dimension to reciprocally mate with respective recesses and/or protrusions located on a portion of a wall section (e.g., a wall section edge, etc.) such that the post mates with a predetermined wall section. The posts can be positioned at predetermined locations, for example, at a location along the perimeter of the completed integral combined monument 14a where wall sections are configured to "join" together (e.g. corners, etc.). For example, for the purpose of joining the common interior wall 60, posts can occur at a position along the length of at least one wall section to bisect the monument footprint in a way that forms two compartments within the integral combined monument.

Through the engagement of the posts with portions of monument wall sections, a predetermined amount of relative movement can be allowed. In this way, vibrational forces and structural flexure that may traverse through an aircraft structure in flight can be minimized and can result in such vibrational forces and structural flexure not being as easily perceived or "sensed" or "felt" by an occupant stationed in a monument compartment such as, for example, a lavatory.

In such an engaged relationship, the walls may be said to minimally "float" a small distance (e.g., a distance ranging from about 0.05 to about 0.25 inches). In addition, the posts and/or the wall sections and/or wall section portions (e.g., wall section edges that engage with the posts, etc.), can comprise or otherwise be made from a material comprising a predetermined damping effect to, for example, absorb or dissipate an amount of vibrational force. Such material can include, for example, a rubber, plastic, composite material, etc., having a predetermined dampening characteristic, a predetermined Young's modulus, etc.

FIG. 5 is an overhead view illustrating further present aspects where an integral combined monument 14b (similar to integral combined monument 14a shown in FIG. 4A) can be alternately configured such that the third wall section 53 comprises a folded section 53a, with folded section 53a comprising a folding mechanism 53b that can be at least one element such as, for example, a mechanical device such as, for example, at least one hinge located at one or more predetermined folding points along its width and along the y-axis. Further, as shown in FIG. 5, according to the illustrated configuration, and according to present aspects, fifth wall section 55 comprises a folded section 55a, with folded section 55a comprising a folding mechanism 55b that can be at least one element such as, for example, a mechanical device such as, for example, at least one hinge located at one or more predetermined folding points along its width and along the y-axis. It is understood that the folded wall section can be an entry point into a compartment of the monument (e.g., a door, etc.).

Although not shown in FIG. 5, when more space is needed in compartment 16a, common interior wall 60 can be moved from an initial linear common interior wall position by folding common interior wall 60 in a way that impinges or otherwise reduces the space in compartment 16b, and commensurately increases the interior dimension (e.g., available area) of compartment 16a. See FIG. 9. Posts are shown engaging the wall sections to form and support monument 14b in a fashion similar to that shown at least in FIG. 4A, except that, as shown in FIG. 5, a portion of fourth wall section 54 and a portion of common interior wall 60 (and, if desired a portion of fifth wall section 55 in the closed orientation) can engage post 84a.

According to present aspects, the plurality of wall sections can be linear in a non-folded state, and the portions of one or more of the plurality of wall sections can comprise predetermined non-linear sections, for example, curved sections that mate with, or otherwise abut adjacent wall sections to form curved corners. In further aspects, the non-linear section can be discrete (e.g., additional, etc.) curved wall sections that, for example, form integral combined monument curved corners.

FIG. 6A shows an integral combined monument 14c having a predetermined integral combined monument footprint that differs slightly from the monuments 14a, 14b, as monument 14c comprise a curved wall section 62 at the juncture of third wall section 53 and fourth wall section 54. As further shown in FIG. 6A, common interior wall 60 is not linear in a single plane along its entire length and instead "jogs" in a predetermined configuration. While FIG. 6A shows common interior wall 60 in a "closed" or intact position dividing compartment 16a and compartment 16b, in an alternate configuration (not shown in FIG. 6A) common interior wall 60 can comprise a folded section 60a comprising a folding mechanism 60b (that can be at least one element such as, for example, a mechanical device such as, for example, at least one hinge) that be folded and configured into a stowed state, for example, by moving the folded section of the common interior wall 60 to a stowed orientation location adjacent to fifth wall section 55.

As shown in FIG. 6A, when the common interior wall 60 is folded from an initial linear orientation, monument 14c can be converted from a two-compartment integral combined monument having two compartments 16a, 16b, into a monument having a single interior compartment. Posts 81, 82 83, 84, 85, 86, are shown engaging the wall sections to form and support monument 14c in a fashion similar to that shown in FIGS. 4A and 5. As shown in FIGS. 4A and 5, toilet 110, shelf 111, and sink 112 are shown in FIG. 6A at predetermined locations in compartments 16a, 16b of integral combined monument 14c. FIG. 6A further shows sixth wall section 56 positioned immediately adjacent to the outboard wall interior 24 of outboard wall 22. Further, FIG. 6A shows handrail 120 that can be attached to or otherwise integral with shelf 111. Posts are shown engaging the wall sections to form and support monument 14c in a fashion similar to that shown at least in FIGS. 4A and 5.

FIG. 6B is an overhead view, according to present aspects, showing an alternate configuration for an integral combined monument 14d that can comprise some of the convertible wall section features of monuments shown in FIGS. 4A, 5, and 6A. FIG. 6B shows a common interior wall 60 that can be formed by closing interior wall folded section 60a, with folded common interior wall section 60a comprising a common interior wall folding mechanism 60b that can be at least one element such as, for example, a mechanical device such as, for example, at least one hinge located at one or more predetermined folding points along its width and along the y-axis.

FIG. 6B shows a second wall section 52 comprising a second wall folded section 52a, with second wall folded wall section 52a comprising a second wall folding mechanism 52b. As shown in FIG. 6B, monument 14d is understood to can comprise the advantages of monuments 14, 14a, 14b, 14c, with monument 14d comprising wall 56 having a folded section 56a comprising a folding mechanism 56b, with sixth wall 56 not being positioned against an outboard wall of an aircraft, but with integral combined monument 14d potentially being located, for example, between aisles in an aircraft cabin interior such that, for example, integral combined monument 14d is not bounded by an aircraft wall. Posts 81, 82, 83, 84, 84a, 84b, 85, 86 are shown engaging the wall sections to form and support integral combined monument 14d in a fashion similar to that shown at least in FIGS. 4A, 5, and 6A. The orientation of the objects and appointments (e.g., toilet 110, shelf 111, sink 112, etc.) in compartment 16b differs from the orientation of such appointments as shown, for example, in FIG. 6A illustrating, in non-limiting fashion, the versatility of the orientation of the contents of compartments 16a, 16b, according to present aspects.

FIGS. 7, 8, and 9 are overhead views illustrating further present aspects showing non-limiting further orientations of integral combined monuments 14e, 14f, 14g, respectively. FIG. 7 shows an integral combined monument 14e similar to the integral combined monument 14c shown in FIG. 6A. As shown in FIG. 7, integral combined monument 14e comprises a first compartment 16a and second compartment 16b, and further comprises a common interior wall 60 that does not fold (as opposed to, for example, the common interior wall 60 shown in FIG. 6B). Integral combined monument 14e comprises curved wall section 62 that can be a discrete wall section, or that can be part of third wall section 53 or a part of fourth wall section 54. Posts 81, 82, 83, 84, 85, 86 are shown engaging the wall sections 51, 52, 53, 54, 55, 56 to form and support monument 14e in a fashion similar to that shown in FIGS. 4A, 5, 6A, and 6B.

FIG. 8 shows an overhead view of an integral combined monument 14f similar to the integral combined monument 14c shown in FIG. 6A, except, for example, that objects and appointments within compartment 16a are shown in differing locations (e.g., orientations) within compartment 16a. As shown in FIG. 8, second wall section 52 comprises a folded section 52a comprising a folding mechanism 52b that is located along the length of wall section 52 such that the entry point (e.g., door) into compartment 16a along second wall section 52 differs from the entry point shown for monument 14a shown in FIG. 4A. Posts 81, 82, 83, 84, 84a, 84b, 85, 86 are shown engaging the wall sections to form and support monument 14e in a fashion similar to that shown in FIGS. 4A, 5, 6A, 6B, and 7, except that additional post 84a, 84b are shown reinforcing and/or otherwise supporting common interior wall 60. In addition, reinforcing wall section 87 is shown abutting common interior wall section 60.

FIG. 9 shows an overhead view of an alternate configuration of an integral combined monument 14g, according to present aspects, where first wall section 51 and second wall section 52 comprising folding section 52a (that comprises folding mechanisms 52b) abuts with first wall section 51 in a way such that first wall section 51 and second wall section 52 meet at a point comprising a folding section comprising a folding mechanism. As shown in FIG. 9, a folding mechanism is oriented at the juncture "j" formed where first wall section 52 and second wall section 52 meet. Posts 81, 83, 84, 85, 86 are shown engaging the wall sections to form and support monument 14g in a fashion similar to that shown in FIGS. 4A, 5, 6A, 6B, and 7. The integral combined monument 14g shown in FIG. 9 does not include a post configured to join the first wall section 51 and the second wall section 52. Instead, integral combined monument 14g shows a portion of a folded wall section 52a configured to directly engage an adjoining wall, section 51, without adjoining wall sections engaging (e.g., mating with, etc.) a supporting post.

The FIGs. show alternate aspects in non-limiting fashion, for various integral combined monument configurations, including various wall section configurations, that can facilitate, for example, a predetermined placement (e.g. layout) of objects contained within the lavatories occupying compartments 16a, 16b. In addition, as shown in the FIGs., the points of intersection or areas of abutting wall sections can be square (e.g., such that angles approximating 90 degree are established), or the areas of abutting wall sections can establish a predetermined configuration or geometry that can be, for example, an angle other than 90 degrees, regular or irregular geometry, rounded, curved, etc.

FIGS. 10 and 11 illustrate further present aspects. FIGS. 10 and 11 show overhead views of integral combined monuments 14h, 14i, respectively, comprising a non-linear common interior wall 60 shared by adjoining compartments 16a, 16b. As shown, compartment 16a, in FIGS. 10 and 11 comprise a sink that abuts common interior wall 60. Orienting compartment objects (e.g., toilets 110, sinks 112, etc.) in a location within compartments 16a, 16b that abuts the common interior wall 60 shared by compartments 16a, 16b, significantly increases the possible compartment configurations that can be constructed, made, delivered, etc., and the increased compartment appointment variations facilitated by present aspects provides a multitude of tailorable lavatory configurations and lavatory combination configurations that can be contained with compartments 16as, 16b of integral combined monument, according to present aspects.

As shown in FIG. 10, posts 81, 82, 83, 84, 84a, 85, 86 are shown engaging the wall sections 51, 52, 53, 54, 55, 56 to form and support monument 14h, 14i in FIGS. 10 and 11, respectively, in a fashion similar to that shown in FIGS. 4A, 5, 6A, and 6B, and further show the presence of additional post 84a shown in FIG. 10 reinforcing and/or supporting common interior wall 60. Second wall section 52 is shown comprising second wall folding section 52a that comprises a folding mechanism 52b. FIG. 10 further shows fifth wall section 55 comprising fifth wall folding section 55a that comprises a folding mechanism 55b.

In FIG. 11, according to present aspects, the orientation of sinks 112 in compartments 16a, 16b differs from the orientation of sink 112 shown in FIG. 10. In addition, in FIG. 11, the common interior wall 60 is elongated beyond a perimeter of compartment 16b to engage post 84 and to be in communication with monument wall section 53. That is, as shown in FIG. 11, a separate and discrete fourth wall section 54 is obviated in favor of a portion of common interior wall 60 functioning in a fashion similar to the function of fourth wall section 54 shown in other FIGs. herein.

FIGS. 10 and 11, according to present aspects illustrate the proximity of aircraft door 12 to monuments 14h and 14i when the aircraft door is in a closed position; the orientation of the door during taxi, take-off and when the aircraft is "in-flight". Aircraft door 12 is illustrated in "dotted lines". When passenger egress from the aircraft is required and the aircraft door is configured into and maintained in an "open" position, the aircraft door no longer inhibits egress from the aircraft via an egress pathway 21 that can comprise with the egress area an attendant area 20. As shown in the FIGs., both egress pathway 21 and a potentially overlapping or otherwise at least partially coincidental attendant area 20 (shown as a shaded area, and with the attendant area 20 potentially at least partially coincidental with the egress pathway 21) immediately abut monument 14h, 14i, according to present aspects. Further, according to present aspects, the FIGs. show instances where the attendant area and egress area exist, but are not explicitly labelled.

FIGS. 12 and 13 are overhead views illustrating further potential configurations of presently disclosed integral combined monuments, according to present aspects. As shown in FIG. 12 integral combined monument 14j is similar to monument 14h with respect to common interior wall placement and exterior wall section placement. Integral combined monument 14j shows fixed safety support structures in the form of handrails 120 attached both to first wall section 51, second wall section 52 and also attached to sink 112. Such handrails 120 and their placement, including placement into or onto wall sections, are of particular importance in providing a safe environment, especially for PRMs, etc. FIG. 12 further shows posts 81, 82, 83, 84, 84a, 84b, 84c, 85, 86 are shown engaging the wall sections 51, 52, 53, 54, 55, 56 to form and support monument 14j, with the addition of posts 84a, 84b, and 84c engaging portions of common interior wall 60.

An alternate compartment layout for combined lavatories in an integral combined monument, according to present aspects, is further shown in FIG. 13 illustrating integral combined monument 14k. FIG. 13 shows orienting compartment objects (e.g., a toilet 110, a sink 112, etc.) in a location within compartments 16a, 16b that does not abut the common interior wall 60 shared by compartments 16a, 16b (as shown, e.g., at least in FIGS. 10 and 11), but that still significantly increases the possible compartment configurations that can be constructed, made delivered, etc. FIG. 13 shows the increased compartment appointment space facilitated by present aspects that can provide a multitude of tailorable lavatory configurations and lavatory combination configurations that can be contained with compartments 16a, 16b of integral combined monument, according to present aspects. Posts 81, 82, 83, 84, 84a, 84b, 84c, 85, 86 are shown engaging the wall sections to form and support monument 14j in FIG. 12 and monument 14k in FIG. 13 in a fashion similar to that shown in FIGS. 4A, 5, 6A, 6B, and 7, except that additional posts 84a, 84b, 84c are shown reinforcing and/or otherwise supporting common interior wall 60.

For example, FAA regulations specifying exit access and width of aisle provide the mandated area required by government regulation (See FAA regulations 14 C.F.R. §§ 25.813; 25.815, etc.). Such regulated areas in aircraft for on ground egress, etc., typically have remained "clear" or unused in-flight, at least with respect to installed monuments including, for example, lavatory placement, galley placement, etc. That is, regulated areas that are required to remain accessible and unobstructed when the aircraft is on the ground (e.g., not in-flight) have not been utilized during flight. FIGS. 10, 12, and 13 show, in the shaded region, regulated areas that abut the presently disclosed monuments.

Present aspects disclose integral combined monuments for aircraft cabin interiors that possess reduced footprints through an improved utilization of available space that can include, within the integral combined monument footprint, the use of otherwise "regulated" or "regulatorily mandated" space and pathways that must be maintained as "clear" and "unobstructed" during, for example, takeoff, landing, etc. (for example, such regulated areas are maintained as "clear" areas) for crew persons to assist passengers in the use of escape devices from an aircraft, with such areas (e.g., egress pathways, etc.) including, for example, 20 in. or 36 in. assist areas and egress pathways as may be required by regulating authorities.

According to present aspects, installation, retention, and stability performance of the integral combined monuments can be facilitated by maintaining the integral combined monument in a predetermined location that abuts an unused attendant area and egress pathway during flight (e.g., as opposed to during taxi, takeoff, landing, etc.). As explicitly shown, at least in FIGS. 10, 11, 12, 13, by configuring the monument footprint to abut an aircraft exit door, at least a portion of the monument footprint can abut regions or areas of that aircraft that include regulated or mandated pathways for emergency and standard egress that must remain "clear" of obstruction in a deplaning scenario.

As disclosed herein, integral combined monuments can comprise two compartments into an integral combined monument with each compartment comprising a lavatory. Further present aspects comprise incorporating at least one galley component configured to occupy one monument compartment integrally with a lavatory configured to occupy the other monument compartment, and with the two adjoining compartments sharing a common interior wall.

FIGS. 14 and 15, show integral combined monuments comprising two compartments, with one compartment comprising a lavatory abutting a second compartment, and with the second compartment comprising galley components, with both immediately adjoining compartments incorporated within the footprint of a single integral combined monument. According to present aspects, FIGS. 14 and 15 are overhead views of an integral combined monument 114a, 114b, respectively, in an aircraft cabin interior. As shown in FIG. 14, an integral combined monument 114a comprises a monument first compartment 116a and a monument second compartment 116b. As shown in FIG. 14, monument first compartment 116a houses a monument first area configured into a first lavatory. FIG. 14 further shows monument second compartment 116b housing a monument second area configured into a galley comprising a plurality of galley components 132, 134, 136, 138, with monument common interior wall 160 separating first compartment 116a from second compartment 116b.

According to present aspects, FIGS. 14 and 15 show the orientation and configuration of the integral combined monuments 114a, 114b, respectively, located proximate to the outboard wall interior 24 of outboard wall 22, and proximate to aircraft door 12, and further immediately proximate to the attendant area 20 located near or at least partially comprising the mandated egress pathway 21 proximate to the aircraft door 12. As further shown in FIG. 14, integral combined monument 114a is positioned proximate to aircraft seat row 44 comprising a plurality of aircraft seats 46.

Focusing on the integral combined monument overall dimension, or "footprint", FIG. 14 is an overhead view of an integral combined monument 114a having a plurality of compartments 116a, 116b and an overall monument footprint, according to present aspects, that is equivalent to the outer perimeter of the integral combined monument 114a. For representative purposes, the monument perimeter or "footprint" is simplified to highlight present aspects of a monument with respect to comparative dimensions of the various wall sections. In addition, the dotted line represents the monument common interior wall 160 that is "common" to, for example, a first and second compartment (116a, 116b, respectively) contained within the integral combined monument 114a, with common interior wall comprising a common interior wall folded section 160a, with common interior wall folding section 160a comprising folding mechanism 160b. Monument 114a further comprises wall sections 151, 152, 153, 154, 155, and 156. As shown herein in previous FIGs., wall sections are shown engaged to posts enumerated in FIG. 14 as posts 181, 182, 183, 184, 185, and 186. Post 184a is shown engaging fourth wall section and fifth wall section. In addition, fourth wall section 154 can be obviated (along with post 84a being obviated) by extending common interior wall 160 past the perimeter of compartment 116b, such that common interior wall section performs the function of fourth wall section 154 and engages post 184, or engages posts 184 and 184a as well as engaging post 181.

As shown in FIG. 14, an integral combined monument 114a comprises monument first wall section 151 that abuts monument second wall section 152 and that further abuts monument sixth wall section 156. Monument second wall section 152 abuts first wall section 151 and further abuts monument third wall section 153. Monument third wall section 153 abuts second wall section 152, common interior wall section 160 and fourth wall section 154. Fourth wall section 154 abuts third wall section 153 and fifth wall section 155 and common interior wall section 160. Fifth wall section 155 abuts fourth wall section 154 and further abuts sixth wall section 156. Finally, sixth wall section 56 abuts fifth wall section 155 and further abuts first wall section 151. Monument first wall section 151 further abuts monument common interior wall 160. Monument sixth wall section 156 is shown in FIG. 14 as oriented proximate to outboard wall 22 of an aircraft cabin interior. Monument second wall section 152 is shown comprising a monument second wall folded section 152a, with monument second wall folded section 152a comprising a folding mechanism 152b that can be at least one element such as, for example, a mechanical device such as, for example, at least one hinge located at one or more predetermined folding points along its width and along the y-axis. As shown in FIG. 14, integral combined monument 114a comprises an entry point to the lavatory contained compartment 116a via a folded section 152a (comprising folding mechanism 152b) of second wall section 152.

FIG. 14 further shows common interior wall 160 comprising a common interior wall folded section 160a, with monument common interior wall section 160a comprising a folding mechanism 160b that can be at least one element such as, for example, a mechanical device such as, for example, at least one hinge located at one or more predetermined folding points along its width and along the y-axis. As stated herein, it is understood that fourth exterior wall section 154 can be obviated by extending monument common interior wall 160 to the distance required to equal the length of extending monument common interior wall 160 and fourth exterior wall section 154 required to enclose compartment 116a.

As shown in FIG. 14, since only compartment 116a in the illustrated configuration comprises a lavatory, the folded section of common interior wall section 160a can move from a linear common wall to a folded wall section not necessarily to alter the dimension and configuration of the lavatory itself, but, for example, to facilitate installation of objects within the lavatory (or galley that is then accessible from the lavatory compartment), facilitate installation and/or facilitate removal and/or facilitate servicing/maintaining/cleaning, etc., of the integral combined monument 114a. As shown in FIG. 14, aircraft seating row 44 can comprise aircraft plurality of aircraft seats 46, with the integral combined monument 114a oriented proximate to the aircraft seating row 44.

According to present aspects, FIG. 15 shows an alternate configuration for an integral combined monument 114b where the fourth monument wall section 154 is out-of-plane with respect to the common interior wall section 160. As shown in FIG. 15, according to present aspects, monument first wall section 151 further abuts monument common interior wall 160, and monument sixth wall section 156 can be oriented proximate to outboard wall 22 of an aircraft cabin interior. Monument third wall section 153 is shown comprising a monument second wall folded section 153a, with monument second wall folded section 153a comprising a folding mechanism 153b that can be at least one element such as, for example, a mechanical device such as, for example, at least one hinge located at one or more predetermined folding points along its width and along the y-axis.

As mentioned herein, FIGS. 14 and 15 show integral combined monuments comprising two compartments 116a, 116b, with one compartment 116a comprising a lavatory abutting a second compartment 116b comprising galley components within the footprint of a single integral combined monument 114a, 114b, respectively. Galley area 130 can comprise a plurality of galley components 132, 134, 136, 138, with the galley components shown in FIGS. 14 and 15 oriented in compartment 116b immediately adjacent to common interior wall 160.

FIG. 16 illustrates a perspective view of a galley comprising galley components, with the galley components incorporated, or otherwise integrated into, an aircraft cabin interior integral combined monument, according to present aspects. As shown in FIG. 16, a galley component 200a comprises a predetermined overall galley footprint that can be approximately equivalent in area to the area available within one of the compartments 116a, 116b housed within the integral combined monuments disclosed herein (and shown, for example, as 114a, 114b in FIGS. 14 and 15). Galley component 200a comprises galley sections 202a, 202b, 202c, 202e, 202f, with a galley section 202d not visible in FIG. 16 (with galley section 202d visible in FIG. 20). As shown in FIG. 16, common interior wall 160 is shown to represent the orientation of the galley component 200a that can be oriented within an integral combined monument relative to the common interior wall 160. When the galley component is oriented within, for example, compartment 116b of the present integral combined monuments (e.g., monuments 114a, 114b shown in FIGS. 14, 15), galley sections 202b, 202c and 202f will be oriented immediately adjacent to common interior wall 160 of the integral combined monument. According to present aspects, the galley component can comprise galley upper section 206 and galley lower section 204.

According to present aspects, FIG. 17 shows a present aspect where common interior wall 160 can comprise a common interior wall through-opening 220 through the thickness of common interior wall 160. As shown in FIG. 17, galley section 202g of galley component 200b comprises a cutaway section 202g' that will rest immediately adjacent to common interior wall 160 when galley component 200b is installed or otherwise positioned or oriented within an integral combined monument, according to present aspects. In this aspect, common interior wall through-opening 220 can be configured to substantially align with the cutaway section (also referred to herein as a "storage area" 202g') 202g' in galley section 202g. In this configuration within the integral combined monument, the compartment housing for, for example, a lavatory that adjoins common interior wall 160 within the integral combined monument can comprise a cabinet or other feature that extends from the lavatory into the galley section 212. Galley section 212 could comprise a feature that could further comprise a waste compartment entry point for products (e.g., discarded lavatory paper products, etc.,) wherein such products could be deposited by a lavatory occupant such that the paper waste discarded from a passenger within the lavatory can accumulate in a receptacle that is located outside of the lavatory compartment, and in a waste receptacle 212b housed, for example in a waste receptacle compartment section 212a housed in the adjoining galley compartment, or in an adjoining component that can be, for example, a closet (referred to equivalently herein as a "closet compartment", a closet component, etc.

According to present aspects, the ability to recess storage containers and receptacles for one compartment into a storage area of an adjoining compartment is facilitated by the presence of the common interior wall section. For example, rather than impact and otherwise use space in the lavatory compartment of the presently disclosed integral combined monuments, when the common interior wall is fashioned with a through opening, a receptacle or storage bin, cabinet, etc. can be recessed with respect to the common interior wall on the lavatory compartment "side". In this way the physical impact of the storage compartment, receptacle etc. resides within the galley compartment on the galley compartment "side" of the integral combined monument. The space saved in, for example, a lavatory can be significant and render an apparent and realized space savings of, for example, several cubic feet within the lavatory compartment.

In addition to the space saved in, for example, a lavatory compartment as explained herein, the integral combined monuments save considerable and significant space through the incorporation of the common interior wall section, and through the incorporation of monument wall sections of various and predetermined dimension. As explained herein, standard and typical "square" or "rectangular" monuments cannot be altered or tailored to fit into certain location, including locations that adjoin or abut regulated aircraft egress pathways. In contrast to typical, modular, "square" or "rectangular" aircraft monuments having a dimension that cannot be tailored or altered, according to present aspects, the integral combined monuments can be tailored in dimension in a predetermined fashion to accommodate an irregular space (e.g. a non-square" or "non-rectangular" area, such as areas within an aircraft that adjoin or abut aircraft zones or regions that have a regulated area requirement that must be kept unencumbered, and that may be irregular in their area, or that may cause an adjoining area to be an irregularly-shaped space or dimension (e.g., a "non-square" or "non-rectangular" space or dimension, etc.).

According to present aspects, by being able to construct and install aircraft cabin monuments in locations that could not previously be used to house monuments due to conventional monument footprint requirements, the presently disclosed integral combined monuments can occupy these previously unused cabin locations. Doing so enables aircraft designers to remove monuments from locations that adjoin passenger seating, and replace the obviated monuments with additional passenger seating. Again, according to present aspects, the integral combined monuments "trade" the space previously used for lavatory and/or galley monuments in favor of creating additional passenger seating. The monuments are instead relocated to previously unused space in a significantly enhanced use of on-board aircraft cabin space efficiency.

FIGS. 18, 19, and 20 illustrate alternate aspects of exemplary lower galley section 204 configurations. FIG. 18 shows galley lower section 204 comprising two galley sections 210, 212 positioned adjacent to each other. An alternate aspect is shown in FIG. 19, where galley lower section 204 comprises three adjacent sections, 210, 202*c*, and 202*c*. FIG. 20 shows lower galley section 204 (e.g., lower galley section 204 as shown in FIG. 16), with galley lower section 204 comprising adjacent galley sections 202*a*, 202*b*, 202*c*, and 202*d*. Present aspects contemplate any useful number of galley sections incorporated into the presently disclosed galley components that can be housed in a compartment of the presently disclosed integral combined monuments.

FIG. 21 is an overhead view of installed wall sections 51 and 55 of, for example, integral combined monument 14*c* such as that shown in FIG. 6A. As shown in FIG. 21, post 86 secures or engages integral combined monument first wall section 51 into a secured configuration with outboard wall 22. Similarly, post 85 secures or engages integral combined monument fifth wall section 55 into a secured configuration with outboard wall 22. When a sixth wall section is used, and the sixth wall section, as shown in FIG. 21, the outboard wall 22 can perform the function of a sixth wall section (56, 156) shown in the FIGs. herein.

As mentioned herein, the posts and the wall section portions that engage with the posts can be fastened with any appropriate fasteners, or can otherwise engage the posts in a friction, or near-friction fit without the presence of fasteners. In addition, the posts and the wall section portions that engage with the posts can be secured together by appropriate mating of the parts. For example, as shown in FIG. 21, according to present aspects, the post can comprise protrusions or recesses having a predetermined dimension to reciprocally mate with respective recesses and/or protrusions located on a portion of a wall section (e.g., a wall section edge, etc.) such that the post mates with a predetermined wall section.

As shown in FIGS. 14, 15, and 21, the integral combined monument, according to present aspects, can incorporate the outboard wall as a part of monument (e.g., the sixth wall section of the monument), and obviate the need for a sixth wall section. According to this aspect, in addition to the presence of a common interior monument wall, a multifunctional outboard wall, and the incorporation of the multifunctional outboard wall as a structural component of an integral combined monument disclosed herein, can further reduce the overall monument weight in an aircraft, and can further reduce the overall aircraft weight, as well as. further economize space within the aircraft (e.g., further reducing a monument footprint), and potentially allow additional space within the aircraft for installation of additional seating in the aircraft.

According to present aspects, and as disclosed herein, through the engagement of the posts with portions of monument wall sections, a predetermined amount of relative movement of wall sections of the integral combined monuments can be achieved. FIG. 22 shows a non-limiting representative view of a wall section of an integral combined monument. As shown in FIG. 22, post 81 engages first wall section 51 with fasteners 223. According to present aspects, the wall sections can be secured in a fixed or a partially-fixed configuration with an aircraft structure, assembly, sub-assembly, support structure, etc., including, for example, a floor assembly, a ceiling assembly, an outboard wall assembly, etc. In a partially-fixed configuration, one or more wall sections can be allowed to move slightly (e.g., from about 0.05 to about 0.25 inches, etc.). Accordingly, FIG. 22 shows post 81 securing wall section 51 to a ceiling component 222 or, for example, a ceiling sub-assembly, with post 81 also securing wall section 51 to a floor component 224 of a floor assembly. Fastener 223 is shown engaging post 81 at a fastener slot 221 in post 81, with the fastener slot exaggerated to indicate that, when engaged with the fastener slot, the fastener will allow a component that is fastened to the post (e.gt., a well section for a compartment of an integral combined monument, etc., according to present aspects) a predetermined amount of movement or "play" for purposes of damping or dissipating transmittance of aircraft vibrational force, structural flexure, etc., into the integral combined monument compartments.

According to present aspects, methods are disclosed for forming, installing, etc. integral combined monuments in aircraft to conserve and create additional space that can be, for example, converted into additional seating while creating integral combined monuments with reduced weight, greater functional flexibility at least in terms of tailorability and versality, for example, in terms of construction, maintenance, utility, and appointments contained therein.

FIGS. 23, 24, 25, and 26 are flowcharts outlining methods according to present aspects. As shown in FIG. 23, a method 2300 for installing an aircraft cabin interior integral combined monument is outlined, with the method 2300 including providing 2302 a plurality of monument outer wall sections and providing 2304 a common interior wall section. The method further includes providing 2306 a plurality of posts and engaging 2308 the outer wall sections with the posts to form an integral combined monument and forming 2310 an integral combined monument comprising a common interior wall. According to method 2300 outlined in FIG. 23, and according to present aspects, the plurality of posts can be configured to engage at least one of: an aircraft cabin ceiling assembly, an aircraft cabin floor assembly; an outboard wall assembly; and assemblies and subassemblies to which aircraft cabin ceilings, floor and outboard walls are themselves attached. The plurality of posts can engage a varying number of the monument wall sections at various and multiple points along the length of the wall sections. The methods shown in FIG. 23 contemplate installing and constructing the integral combined monuments of the type shown in one or more of at least FIGS. 1-15.

As shown in FIG. 24, a method 2400 for installing an aircraft cabin interior integral combined monument is outlined, with the method 2400 including providing 2402 a plurality of monument outer wall sections, with a plurality of the monument wall section comprising varying lengths and providing 2304 a common interior wall section. The method further includes providing 2306 a plurality of posts and engaging 2308 the outer wall sections with the posts to form an integral combined monument and forming 2310 an integral combined monument comprising a common interior wall. According to present aspects, the varying length of a plurality of the wall sections facilitates tailorability and flexibility of the installation of the integral combined monument on an aircraft for the purpose of constructing multiple compartments having a common interior wall section between the adjacent compartments, such that, for example, that the compartments can contain a different area within each compartment with respect to one another, and the perimeter of each compartment can be different. The methods shown in FIG. 23 contemplate installing and constructing the integral combined monuments of the type shown in one or more of at least FIGS. 1-6A and 7-15.

As shown in FIG. 25, and according to present aspects, a method 2500 for installing an aircraft cabin interior integral combined monument is outlined, with the method 2500 including providing 2302 a plurality of monument outer wall sections and providing 2304 a common interior wall section. The method further includes providing 2306 a plurality of posts and engaging 2308 the outer wall sections with the posts to form an integral combined monument and forming 2310 an integral combined monument comprising a common interior wall. Method 2500 further includes forming 2502 an aircraft cabin interior integral combined monument, with the integral combined monument comprising a first compartment adjacent to a second compartment and with the first compartment and second compartment comprising a common interior wall section. The methods shown in FIG. 25 contemplate installing and constructing the integral combined monuments of the type shown in one or more of at least FIGS. 1-15.

As shown in FIG. 26, and according to present aspects, a method 2600 for installing an aircraft cabin interior integral combined monument is outlined, with the method 2600 including providing 2302 a plurality of monument outer wall sections and providing 2304 a common interior wall section. The method further includes providing 2306 a plurality of posts and engaging 2308 the outer wall sections with the posts to form an integral combined monument and forming 2310 an integral combined monument comprising a common interior wall. Method 2500 further includes forming 2502 an aircraft cabin interior integral combined monument, with the integral combined monument comprising a first compartment adjacent to a second compartment and with the first compartment and second compartment comprising a common interior wall section. Method 2600 further includes forming 2602 an aircraft cabin interior integral combined monument where the integral combined monument comprises at least six sides and orienting 2604 the integral combined monument adjacent to an aircraft attendant area and further orienting the integral combined monument adjacent to an aircraft egress area. The methods shown in FIG. 23 contemplate installing and constructing the integral combined monuments of the type shown in one or more of at least FIGS. 1-15.

The present aspects may, of course, be carried out in other ways than those specifically set forth herein without departing from characteristics of the disclosure. The present aspects are to be considered in all respects as illustrative and not restrictive, and all changes coming within the meaning and equivalency range of the appended claims are intended to be embraced therein.

What is claimed is:

1. An aircraft comprising:
   an aircraft cabin interior, said aircraft cabin interior comprising:
      an integral combined monument comprising an integral combined monument footprint, said integral combined monument further comprising:
         a monument first compartment and a monument second compartment, said monument first compartment comprising a monument first compartment area, said monument second compartment comprising a monument second compartment area, said monument first compartment area different from the monument second compartment area;
         a plurality of monument wall sections, said plurality of monument wall sections configured to be joined together to form said integral combined monument, said plurality of monument wall sections further configured to further form the monument first compartment and the monument second compartment, said monument first compartment and said monument second compartment comprising at least one common interior wall section;
      wherein at least a portion of a monument first compartment area and at least a portion of a monument second compartment perimeter are both oriented immediately adjacent to an egress area;
      wherein a monument first compartment perimeter is greater than the monument second compartment perimeter;
      wherein the integral combined monument footprint comprises an irregularly-shaped footprint;
      wherein at least one of the monument first compartment and the monument second compartment comprises at least one of a lavatory and a galley component;
      wherein the galley component comprises a receptacle, said receptacle configured to be accessible from at least one of the monument first compartment and the monument second compartment; and
      wherein the common interior wall section further comprises a common wall section through opening, said common wall section through opening is adjacent to the receptacle, said receptacle configured to be accessible from the monument second compartment via the common interior wall section through opening.

2. The aircraft of claim 1, wherein the plurality of monument wall sections comprises at least one first monument wall section having a first length (d1), at least one second monument wall section having a second length (d2), said second length different from the first length, and at least one third monument wall section having a third length (d3), said third length different from the first length and second length.

3. The aircraft of claim 1, wherein the at least two of the plurality of monument wall sections of the integral combined monument abut the egress area.

4. The aircraft of claim 1, wherein the common interior wall section is configured to divide the integral combined monument into a monument first compartment and a monument second compartment, said common interior wall section configured to be common to the monument first compartment and the monument second compartment.

5. The aircraft of claim 1, wherein at least one common interior wall section is configured to engage at least one monument post, said at least one monument post configured to engage a support structure, said support structure comprising at least one of an aircraft cabin ceiling component, an aircraft cabin floor component, and an outboard wall component.

6. The aircraft of claim 5, wherein said at least one monument post is configured to be secured to at least one of an aircraft cabin floor assembly, an aircraft cabin ceiling assembly, and a cabin outboard wall.

7. An aircraft cabin monument comprising:
an integral combined monument comprising an integral combined monument footprint, said integral combined monument further comprising:
a monument first compartment, said monument first compartment comprising a monument first compartment perimeter, at least a of portion of said monument first compartment perimeter configured to be oriented immediately adjacent to an egress area, said egress area comprising an attendant area;
a monument second compartment, said monument second compartment comprising a monument second compartment perimeter, said monument first compartment and said monument second compartment comprising at least one common interior wall section, at least a portion of said monument second compartment perimeter configured to be oriented immediately adjacent to the egress area, said at least a portion of said monument second compartment perimeter is further configured to be oriented immediately adjacent to the egress area, said egress area comprising an attendant area;
wherein the monument first compartment is configured to be oriented inboard of the monument second compartment;
wherein the monument first compartment perimeter is greater than the monument second compartment perimeter;
wherein the integral combined monument footprint comprises an irregularly-shaped footprint;
wherein at least one of the monument first compartment and the monument second compartment comprises at least one of a lavatory and a galley component;
wherein the galley component comprises a receptacle, said receptacle configured to be accessible from at least one of the monument first compartment and monument second compartment; and
wherein the common interior wall section further comprises a common wall section through opening, said common wall section through opening is adjacent to the receptacle, said receptacle configured to be accessible from the monument second compartment via the common interior wall section through opening.

8. The aircraft cabin monument of claim 7, said at least one common interior wall section in communication with the monument first compartment and further in communication with the monument second compartment, said common interior wall section configured to be common to the monument first compartment and the monument second compartment.

9. The aircraft cabin monument of claim 8, wherein at least one of the monument first compartment and the monument second compartment is configured to comprise a lavatory.

10. The aircraft cabin monument of claim 8, wherein at least one of the monument first compartment and the monument second compartment is configured to comprise a galley component.

11. The aircraft cabin monument of claim 9, wherein the common interior wall section comprises a common interior wall through opening.

12. The aircraft cabin monument of claim 7, wherein each of at least two of the plurality of monument wall sections are both configured to abut an egress pathway, said egress pathway adjoining an attendant area in an aircraft cabin.

13. The aircraft cabin monument of claim 8, wherein the integral combined monument further comprises at least one monument post, said at least one monument post in communication with at least one of said plurality of monument wall sections.

14. The aircraft cabin monument of claim 13, wherein the at least one common interior wall section is configured to engage a monument post.

15. The aircraft cabin monument of claim 13, wherein at least one of the at least one monument post is configured to engage a support structure, said support structure comprising at least one of: an aircraft cabin ceiling assembly, an aircraft cabin floor assembly, and an outboard wall assembly.

16. The aircraft cabin monument of claim 11, wherein the at least one of the monument first compartment and the monument second compartment comprises a recessed storage area, said recessed storage area in communication with the common interior wall section, said recessed storage area comprising the common interior wall section through opening.

17. The aircraft cabin monument of claim 16, wherein the common interior wall section through opening is in communication with a receptacle, said receptacle located within at least one of the monument first compartment and the monument second compartment, said receptacle configured to be accessible from at least one of the monument first compartment and the monument second compartment via the common interior wall section through opening.

18. A method for installing an aircraft cabin interior monument, the method comprising:
providing a plurality of monument outer wall sections, said plurality of monument outer wall sections comprising at least one first monument wall section having a first length, at least one second monument wall section having a second length, said second length different from the first length, and at least one third monument wall section having a third length, said third length different from the first length and second length;
providing a common interior wall section;
providing a plurality of posts, at least one of said plurality of posts configured to engage at least one of: an aircraft cabin ceiling assembly, an aircraft cabin floor assembly, and an outboard wall assembly;

engaging at least two of the plurality of monument outer wall sections with the at least one of the plurality of posts to form an integral combined monument comprising a monument first compartment, said monument first compartment comprising a monument first compartment perimeter and a monument second compartment, said monument second compartment comprising a monument second compartment perimeter;

engaging the common interior wall section with the at least one of the plurality of posts to form the common interior wall section; orienting the monument first compartment inboard of the monument second compartment;

wherein the monument first compartment perimeter is greater than the monument second compartment perimeter; and wherein the integral combined monument footprint comprises an irregularly-shaped footprint;

wherein at least one of the monument first compartment and the monument second compartment comprises at least one of a lavatory and a galley component; wherein the galley component comprises a receptacle, said receptacle configured to be accessible from at least one of the monument first compartment and the monument second compartment; and wherein the common interior wall section further comprises a common wall section through opening, said common wall section through opening is adjacent to the receptacle, said receptacle configured to be accessible from the monument second compartment via the common interior wall section through opening.

19. The method of claim 18, wherein said monument first monument compartment and said monument second compartment are both in communication with the common interior wall section.

20. The method of claim 18, further comprising:

orienting at least a portion of both the monument first compartment perimeter and the monument second compartment perimeter adjacent to at least one of: an aircraft attendant area and an aircraft egress area.

\* \* \* \* \*